(12) United States Patent
Yamamoto

(10) Patent No.: US 7,831,091 B2
(45) Date of Patent: Nov. 9, 2010

(54) PATTERN MATCHING SYSTEM

(75) Inventor: Yasuhiro Yamamoto, Tokyo (JP)

(73) Assignee: Hoya Corporation, Tokyo (JP)

( * ) Notice: Subject to any disclaimer, the term of this patent is extended or adjusted under 35 U.S.C. 154(b) by 901 days.

(21) Appl. No.: 11/689,664

(22) Filed: Mar. 22, 2007

(65) Prior Publication Data
US 2007/0223819 A1    Sep. 27, 2007

(30) Foreign Application Priority Data
Mar. 23, 2006   (JP) .............................. 2006-081218

(51) Int. Cl.
*G06K 9/00*   (2006.01)
*G06K 9/64*   (2006.01)
*G06K 9/68*   (2006.01)

(52) U.S. Cl. ..................... 382/165; 382/217; 382/218

(58) Field of Classification Search .................. 382/100, 382/103, 162, 165, 209, 217, 218
See application file for complete search history.

(56) References Cited

U.S. PATENT DOCUMENTS

| 6,091,844 | A * | 7/2000 | Fujii et al. .................. 382/135 |
| 6,628,824 | B1 * | 9/2003 | Belanger .................... 382/165 |
| 6,636,635 | B2 * | 10/2003 | Matsugu .................... 382/218 |
| 6,639,998 | B1 * | 10/2003 | Lee et al. .................... 382/103 |
| 7,545,533 | B2 * | 6/2009 | Ok et al. ...................... 358/1.9 |
| 7,756,295 | B2 * | 7/2010 | Yokoi ......................... 382/103 |
| 2006/0132860 | A1 * | 6/2006 | Roh ............................ 358/463 |

FOREIGN PATENT DOCUMENTS

JP    2003-230155    8/2003

OTHER PUBLICATIONS

English Language Abstract of JP 2003-230155.
U.S. Appl. No. 11/686,561 to Yamamoto, filed Mar. 15, 2007.
U.S. Appl. No. 11/686,578 to Yamamoto, filed Mar. 15, 2007.

* cited by examiner

*Primary Examiner*—John B Strege
(74) *Attorney, Agent, or Firm*—Greenblum & Bernstein, P.L.C.

(57)    ABSTRACT

A pattern matching system, comprising a receiver, a comparison block, a calculation block, an output block, a ratio reading block, and a controller, is provided. A likeness value indicates how much a first and second image accords to each other. The receiver receives first and second image signal corresponding to the first and second images as an area signal. The comparison block compares the signal levels of the area signals corresponding to the pattern areas at the relatively same location of the first and second images. The calculation block calculates the likeness value. The ratio reading block reads a amplification ratio by which the first and second image signals are amplified. The controller changes the type of the signal components of the area signal used for the comparison by the comparison block and the calculation of the likeness value by the calculation block.

9 Claims, 21 Drawing Sheets

FIG. 15

| 105 | 40 | 45 | 50 | | |
|-----|-----|-----|-----|-----|-----|
| 55 | 40 | 25 | 25 | 80 | 20 |
| 60 | 70 | 65 | 30 | 95 | 80 |
| 30 | 100 | 95 | 60 | 110 | 75 |
| 120 | 110 | 85 | 120 | 120 | 90 |
| 70 | 40 | 150 | 100 | | |

|   | 1 | 0 | 0 | 0 |   |
|---|---|---|---|---|---|
| 0 | 0 | 0 | 0 | 1 | 0 |
| 0 | 0 | 0 | 0 | 1 | 1 |
| 0 | 1 | 1 | 0 | 1 | 1 |
| 1 | 1 | 1 | 1 | 1 | 1 |
|   | 0 | 0 | 1 | 1 |   |

|   | 0 | 1 | 0 | 0 |   |
|---|---|---|---|---|---|
| 1 | 0 | 0 | 0 | 1 | 0 |
| 0 | 1 | 0 | 1 | 1 | 1 |
| 0 | 1 | 1 | 0 | 0 | 1 |
| 0 | 1 | 1 | 0 | 1 | 0 |
|   | 1 | 1 | 1 | 1 |   |

12b

CA1

PATTERN MATCHING SYSTEM

BACKGROUND OF THE INVENTION

1. Field of the Invention

The present invention relates to a pattern matching system that determines how much a plurality of images accords to each other.

2. Description of the Related Art

A pattern matching system that determines how much a plurality of images compares to each other is known. In the known pattern matching system, the entire captured image is divided into smaller pieces and the luminance values of the individual pieces are compared to the luminance values of corresponding pieces in the same location of different image. The determination of how similar the compared images are to one another is based on the number of corresponding pieces that have the same luminance values. In such a pattern matching method, it is difficult to carry out the pattern matching accurately when the brightness of the images varies substantially.

SUMMARY OF THE INVENTION

Therefore, an object of the present invention is to provide a pattern matching system that accurately carries out the pattern matching for images with a wide variation in brightness.

According to the present invention, a pattern matching system, comprising a receiver, a comparison block, a calculation block, an output block, a ratio reading block, and a controller, is provided. The pattern matching system outputs a likeness value. The likeness value indicates how much a first and second image accords to each other. The receiver receives a first and second image signal corresponding to the first and second images, respectively, as an area signal. The area signal comprises first and second color signal components or luminance and chrominance difference signal components corresponding to the color of a pattern area of which the first and second images are comprised. The comparison block compares signal levels of the area signals corresponding to the pattern areas at the relatively same location of the first and second images. The calculation block calculates the likeness value. The likeness value varies according to the number of the pattern areas where the absolute value of the difference between the compared signal levels of the area signal of the first and second images is less than a predetermined standard value. The output block outputs the likeness value. The ratio reading block reads an amplification ratio by which the first and second image signals are amplified. The controller changes the type of the signal components of the area signal used for the comparison by the comparison block and used for the calculation of the likeness value by the calculation block.

Further, the controller orders the comparison block and the calculation block to compare signal levels and to calculate the likeness value, respectively, using only the first color signal component or the luminance signal component when the amplification ratio is greater than a predetermined threshold value. The controller orders the comparison block and the calculation block to compare signal levels and to calculate the likeness value, respectively, using the first and second color signal components or the luminance and chrominance difference signal components when the amplification ratio is less than a predetermined threshold value.

According to the present invention, a pattern matching system, comprising an image signal generator, a detection block, a selection block, and a pattern matching block, is provided. The pattern matching system estimates how similar a first and second image are to one another. The image signal generator generates plural types of image signals corresponding to the first and second images. The detection block detects the brightness of the first and second image. The selection block selects a number of different types of the image signals for pattern matching based on the detected brightness so that an increase in the number of the selected types is directly proportional to the detected brightness. The pattern matching block carries out pattern matching of the first and second image using the selected type of image signal.

Further, the selection block selects a singular type of the image signal when the detected brightness is less than a predetermined brightness.

BRIEF DESCRIPTION OF THE DRAWINGS

The objects and advantages of the present invention will be better understood from the following description, with reference to the accompanying drawings in which:

FIG. 15 shows an example of signal level of the green signal components of the pixel blocks included in the SA FIG. 16 shows the green signal components of the pixel blocks described in FIG. 15 that have been converted to binary values;

FIG. 17 shows an example of the green signal components of the pixel blocks included in the CA1 that have been converted to binary values;

DESCRIPTION OF THE PREFERRED EMBODIMENTS

Figure 1:
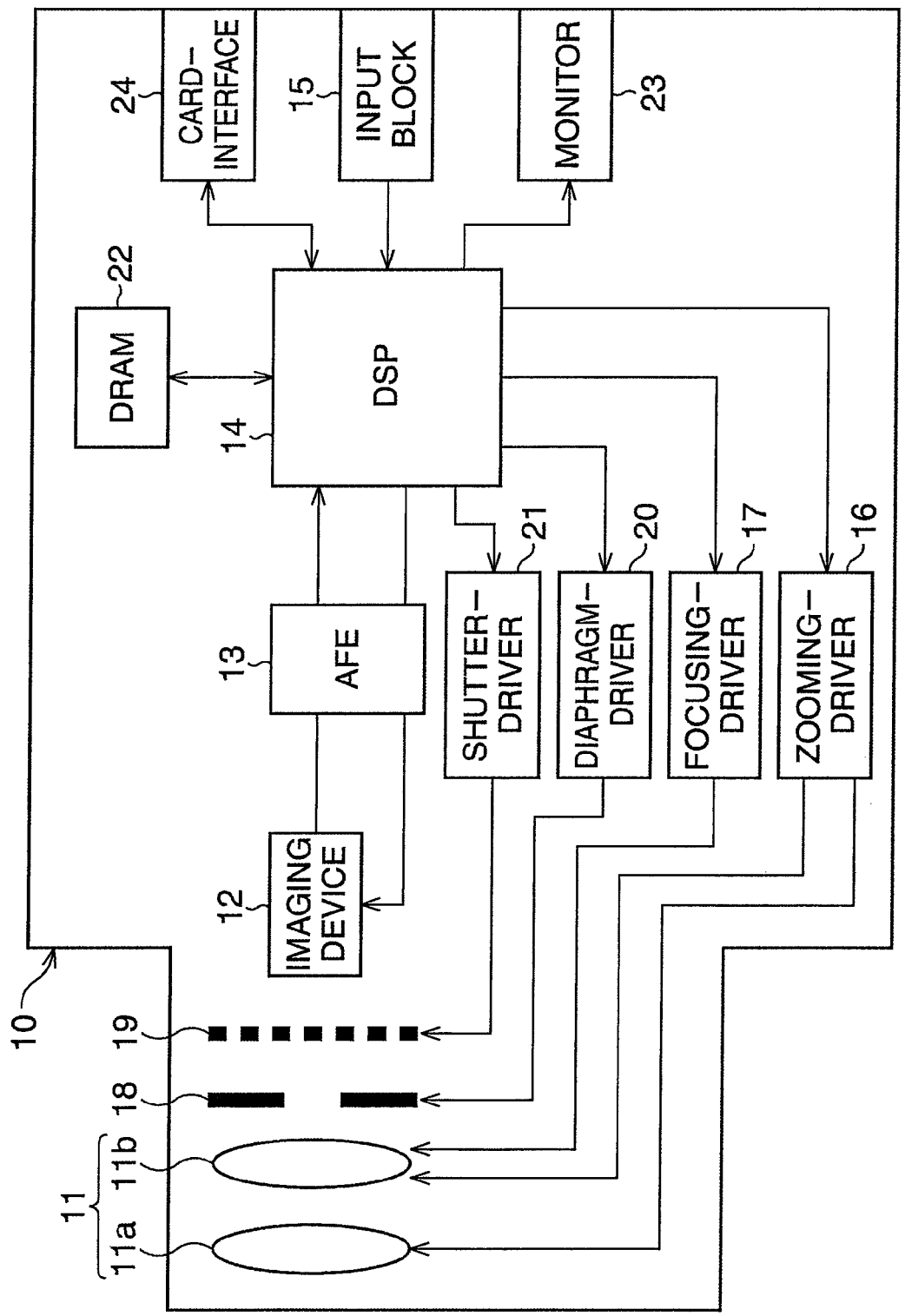
FIG. 1 is a block diagram showing the internal structure of a digital camera having a pattern matching system of a first embodiment of the present invention.

The present invention is described below with reference to the first and second embodiments shown in the drawings.

In FIG. 1, a digital camera 10 comprises a photographic optical system 11, an imaging device 12, an analog front end (AFE) 13, a digital signal processor (DSP) 14, an input block 15, a zooming driver 16, a focusing driver 17, and other components.

The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

The photographic optical system 11 comprises plural lenses, including a zoom lens 11a and a focus lens 11b. The zoom lens 11a and the focus lens 11b are movable along the optical axis of the photographic optical system 11.

The zoom lens 11a and the focus lens 11b form a zoom optical system. The focal length of the photographic optical system 11 is adjusted by moving the zoom lens 11a and the focus lens 11b in relationship to each other. An optical image of an object can be focused on the light-receiving surface of the imaging device 12 by moving the focus lens 11b.

The zoom lens 11a and the focus lens 11b can be moved along the optical axis by the manual operation of a user. In addition, the zoom lens 11a and the focus lens 11b can also be moved by the zooming driver 16. In addition, the focus lens 11b can be moved by the focusing driver 17 for the focus adjustment. Incidentally, the focus adjustment is automatically carried out when an auto focus function, as described later, is commenced.

A diaphragm 18 and a shutter 19 are mounted between the photographic optical system 11 and the imaging device 12. The intensity of light made incident on the light-receiving surface of the imaging device 12 can be varied by adjusting the aperture ratio of the diaphragm 18. An optical image reaches the light-receiving surface by opening the shutter 19, and an optical image is shielded from the light-receiving surface by closing the shutter 19. A diaphragm-driver 20 drives the diaphragm 18 so that the aperture ratio can be adjusted. A shutter-driver 21 drives the shutter 19 so that the shutter 19 can be opened and closed.

Incidentally, the zooming driver 16, the focusing driver 17, the diaphragm driver 20, and the shutter driver 21 are all connected to the DSP 14. The DSP 14 controls the operations of the zooming driver 16, the focusing driver 17, the diaphragm driver 20, and the shutter driver 21.

The imaging device 12 is electrically connected to the DSP 14 via the AFE 13. A clock signal is sent from the DSP 14 to the AFE 13, which generates a frame signal and an imaging device driving signal based on the received clock signal. The imaging device driving signal is sent to the imaging device 12. The imaging device 12 is driven, based on the imaging device driving signal, to generate an image signal that is synchronized with the frame signal.

Figure 2:
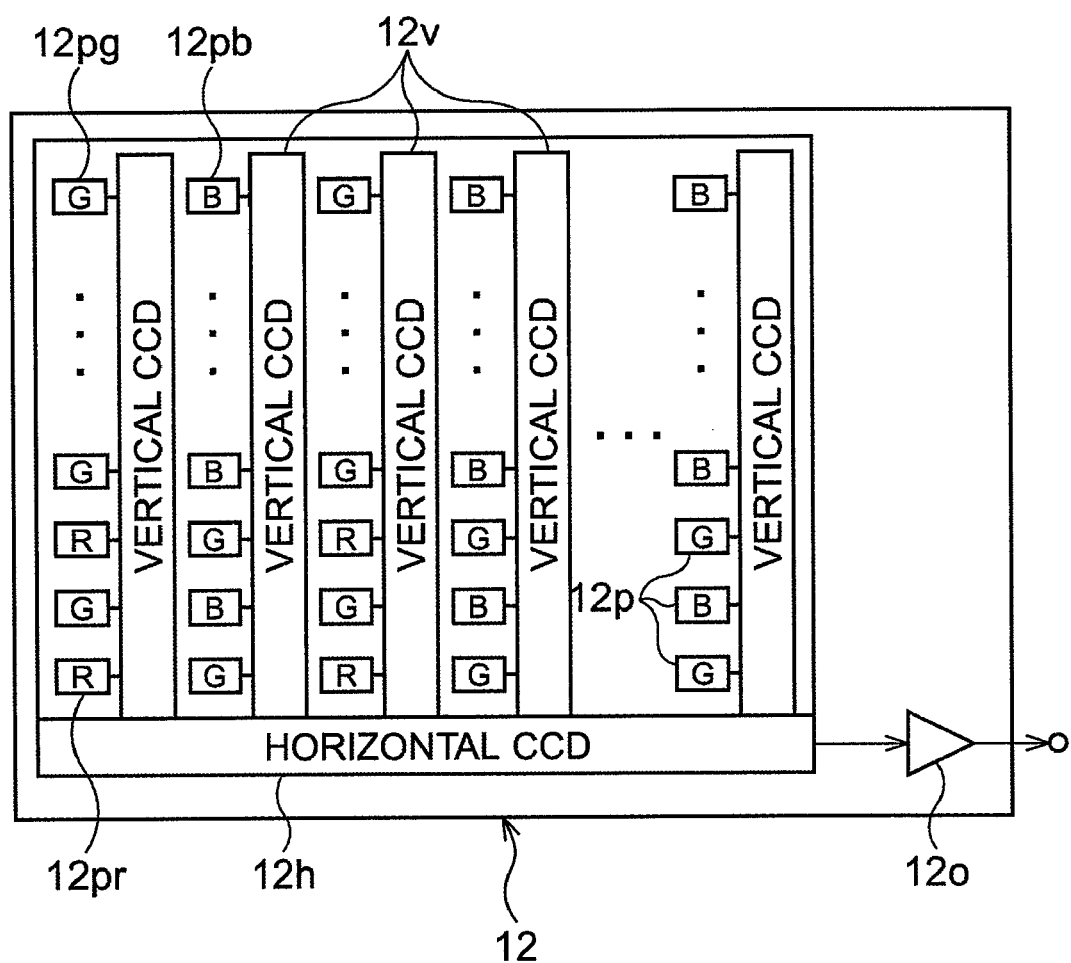
FIG. 2 is a block diagram showing the structure of the light-receiving surface of the imaging device.

As shown in FIG. 2, a plurality of pixels 12p are arranged in a matrix on the light-receiving surface of the imaging device 12. Each pixel 12p within an effective receiving area, hereinafter referred to as an ERA, is covered with one of either a red, green, or blue color filter. The red, green, and blue color filters are arranged according to the Bayer color array.

A red pixel 12pr which is covered with the red color filter generates a red signal charge according to the intensity of the red light component incident to the red pixel 12pr. A green pixel 12pg which is covered with the green color filter generates a green signal charge according to the intensity of the green light component incident to the green pixel 12pg. A blue pixel 12pb which is covered with the blue color filter generates a blue signal charge according to the intensity of the blue light component incident to the blue pixel 12pb.

Incidentally, the imaging device 12 comprises vertical CCDs 12v, a horizontal CCD 12h, and an output block 12o. The red, green, and blue signal charges are transmitted in order to the output block 12o through the vertical and horizontal CCDs 12v, 12h. The output block 12o converts the red, green, blue signal charges into red, green, and blue pixel signals that are potential signals, respectively. Incidentally, the image signal comprises red, green, and blue pixel signals.

The generated image signal is sent to the AFE 13 (see FIG. 1). The AFE 13 carries out correlated double sampling on the image signal and amplifies the image signal by an amplification ratio (or gain) that is designated by the DSP 14. Next, the image signal is converted to image data, which is digital data, and is sent to the DSP 14.

The DSP 14 is connected to a dynamic random access memory (DRAM) 22, which is used as a work memory for the signal processing that is carried out by the DSP 14. The image data received by the DSP 14 is temporarily stored in the DRAM 22. The DSP 14 carries out predetermined data processing on the image data stored in the DRAM 22.

The DSP 14 is connected to a monitor 23. The image data, having undergone predetermined signal processing, is sent to the monitor 23 that is able to display an image corresponding to the received image data.

The DSP 14 is connected to a card-interface 24 that can be connected to a memory card (not depicted). When a release operation is carried out, as described later, the image data, having undergone predetermined data processing, is stored in the memory card.

The DSP 14 is connected to the input block 15, where a user inputs operational commands. The input block 15 comprises a release button (not depicted), a multi-functional cross-key (not depicted), a power button (not depicted), and other buttons. The DSP 14 orders each component of the digital camera 10 to carry out a necessary operation according to a user's command input to the input block 15.

For example, by depressing the release button halfway, a first switch (not depicted) is switched on, and exposure adjustment and focus adjustment are then carried out.

In the exposure adjustment, adjustment of the aperture ratio of the diaphragm 18, adjustment of shutter speed, and the gain adjustment of the image data by the AFE 13, are carried out. For the gain adjustment, the DSP 14 designates the amplification ratio. For the designation of the amplification ratio, the DSP 14 generates luminance data corresponding to each pixel based on red, green, and blue pixel signals. The amplification ratio is designated so that the average data level of luminance data corresponding to an image signal is equal to a predetermined data level. Consequently, when the intensity of light incident to the light-receiving surface is low, the DSP 14 designates a high amplification ratio. Then, the AFE 13 amplifies the image signal by the high amplification ratio. In the focus adjustment, the position of the focus lens 11b is adjusted so that an optical image of the object can be focused on the light-receiving surface.

Further, by fully depressing the release button, a second switch (not depicted) is switched on. Then, the shutter 19 is driven so as to open and close, and the imaging device 12 is driven so as to capture a static optical image.

Figure 3:
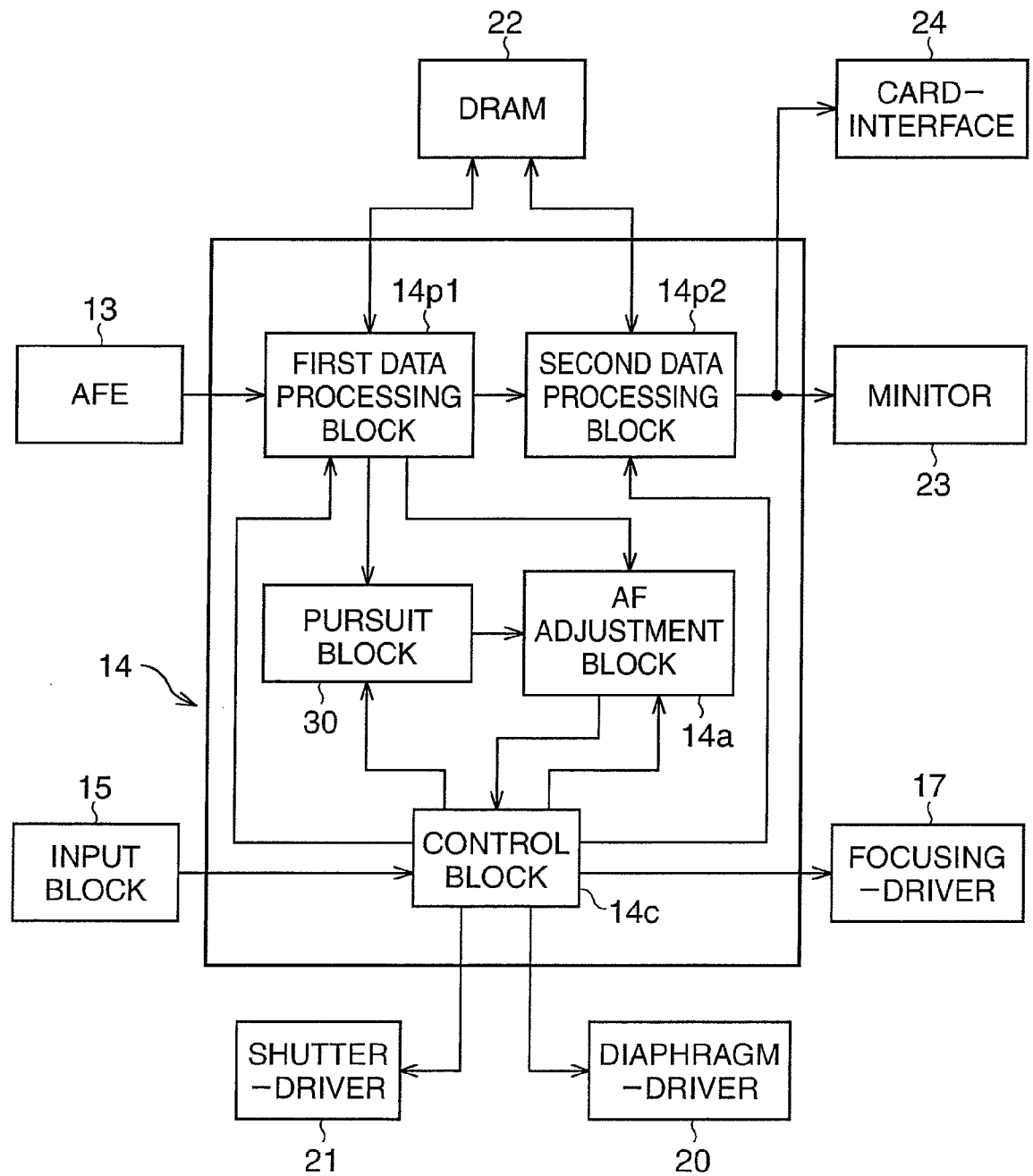
FIG. 3 is a block diagram showing the internal structure of the DSP of a first embodiment.

Next, the internal structure of the DSP 14 is explained below, using FIG. 3. The DSP 14 comprises a first data processing block 14p1, a second data processing block 14p2, a pursuit block 30, an AF adjustment block 14a, and a control block 14c.

The image data sent from the AFE 13 is input to the first data processing block 14p1, which stores the received image data in the DRAM 22. In addition, the first data processing block 14p1 carries out predetermined data processing, such as color interpolation processing, white balance processing, and luminance data generation processing on the stored image data. The first data processing block 14p1 then sends the image data, after having undergone predetermined data processing, to the second data processing block 14p2.

The second data processing block 14p2 carries out predetermined data processing, such as cramp processing and blanking processing, on the received image data. Afterwards, the second data processing block 14p2 sends the image data to the monitor 23 or the memory card via the card-interface 24.

The first data processing block 14p1 also sends the image data to the pursuit block 30 and the AF adjustment block 14a. Based on the received image data, the pursuit block 30 and the AF adjustment block 14a determine, in cooperation with each other, the position of the focus lens 11b so that a desired object is brought into focus on the light-receiving surface of the imaging device 12.

The pursuit block 30 designates one partial area of the entire captured image as a scanning area, hereinafter referred to as the SA. The SA is used for capturing an optical image of an object that is desired by the user to be in focus on the light-receiving surface. If the targeted object, which is the object desired to be in focus, moves within the captured image, the pursuit block 30 pursues the targeted object by sequentially re-designating a new partial area where the targeted object has moved, effectively updating the SA.

The AF adjustment block 14a determines the position of the focus lens 11b so that an optical image captured by the SA is in focus. Incidentally, the position of the focus lens 11b is determined according to the contrast detection method.

The digital camera 10 has both normal auto focus and pursuit auto focus functions. By carrying out the normal auto focus function, an object that is located in a fixed partial area of the entire captured image is brought into focus. By carrying out the pursuit auto focus function, an object that moves within the entire captured image is brought into focus. Either the normal auto focus function or the pursuit auto focus function is selected by an operational command to the input block 15.

An input signal that corresponds to an operational command input to the input block 15 is sent from the input block 15 to the control block 14c. The control block 14c controls the first data processing block 14p1, the second data processing block 14p2, the pursuit block 30, the AF adjustment block 14a, and each component of the digital camera 10 according to the received input signal.

For example, in the exposure adjustment the control block 14c controls both the diaphragm driver 20 to drive the diaphragm 18 and the shutter driver 21 to open and close the shutter 19.

Further, the control block 14c controls the focusing driver 17 to re-position the focus lens 11b in the focus adjustment. In the focus adjustment, the control block 14c receives lens position data corresponding to the position of the focus lens 11b, as determined by the AF adjustment block 14a. The control block 14c controls the focusing driver 17 based on the received lens position data.

Further, the control block 14c designates the amplification ratio used for amplification of the image signal by the AFE 13. In addition, when the pursuit auto focus function is carried out, the control block 14c determines whether or not the designated amplification ratio is greater than a first threshold value. When the amplification ratio is greater than the first threshold value, the control block 14c orders the pursuit block 30 to pursue the targeted object using the green pixel signal components in the image data. On the other hand, when the amplification ratio is less than the first threshold value, the control block 14c orders the pursuit block 30 to pursue the targeted object using the red, green, and blue pixel signal components in the image data.

The brighter the optical image of the object, the lower the designated amplification ratio, in general. Accordingly, when the optical image of the object is bright enough to designate an amplification ratio that is less than the first amplification value, the pursuit of the targeted object is carried out using signal components corresponding to red, green, and blue color components. On the other hand, when the optical image of the object is dark enough to designate an amplification ratio that is greater than the first amplification value, the pursuit of the targeted object is carried out using only one signal component that corresponds to the green color component.

Figure 4:
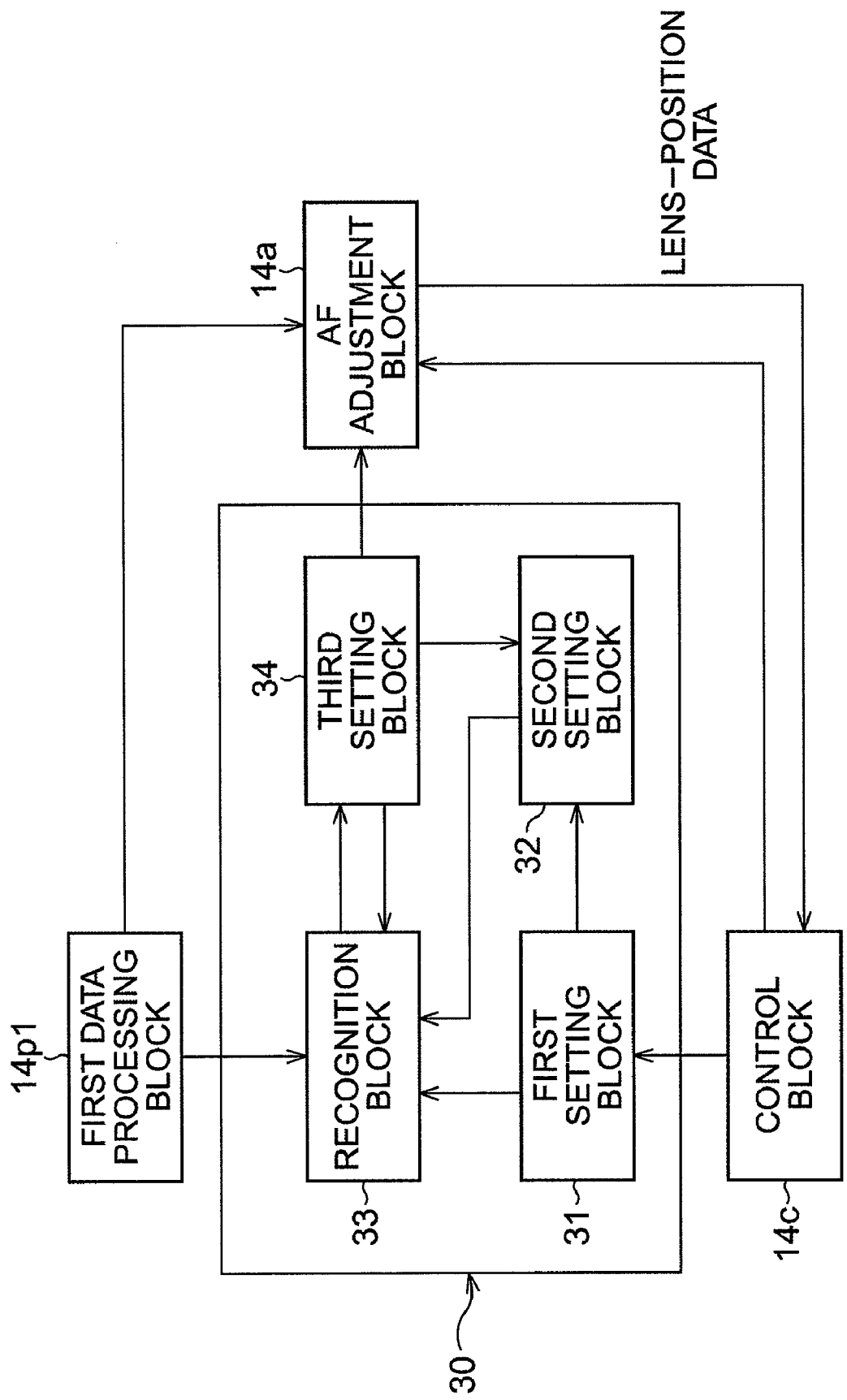
FIG. 4 is a block diagram showing the internal structure of the pursuit block of a first embodiment.

Next, the structure and operation of the pursuit block 30 are explained in detail below, using FIG. 4. The pursuit block 30 comprises a first setting block 31, a second setting block 32, a recognition block 33, and a third setting block 34. Incidentally, each component is controlled by the control block 14c.

Figure 5:
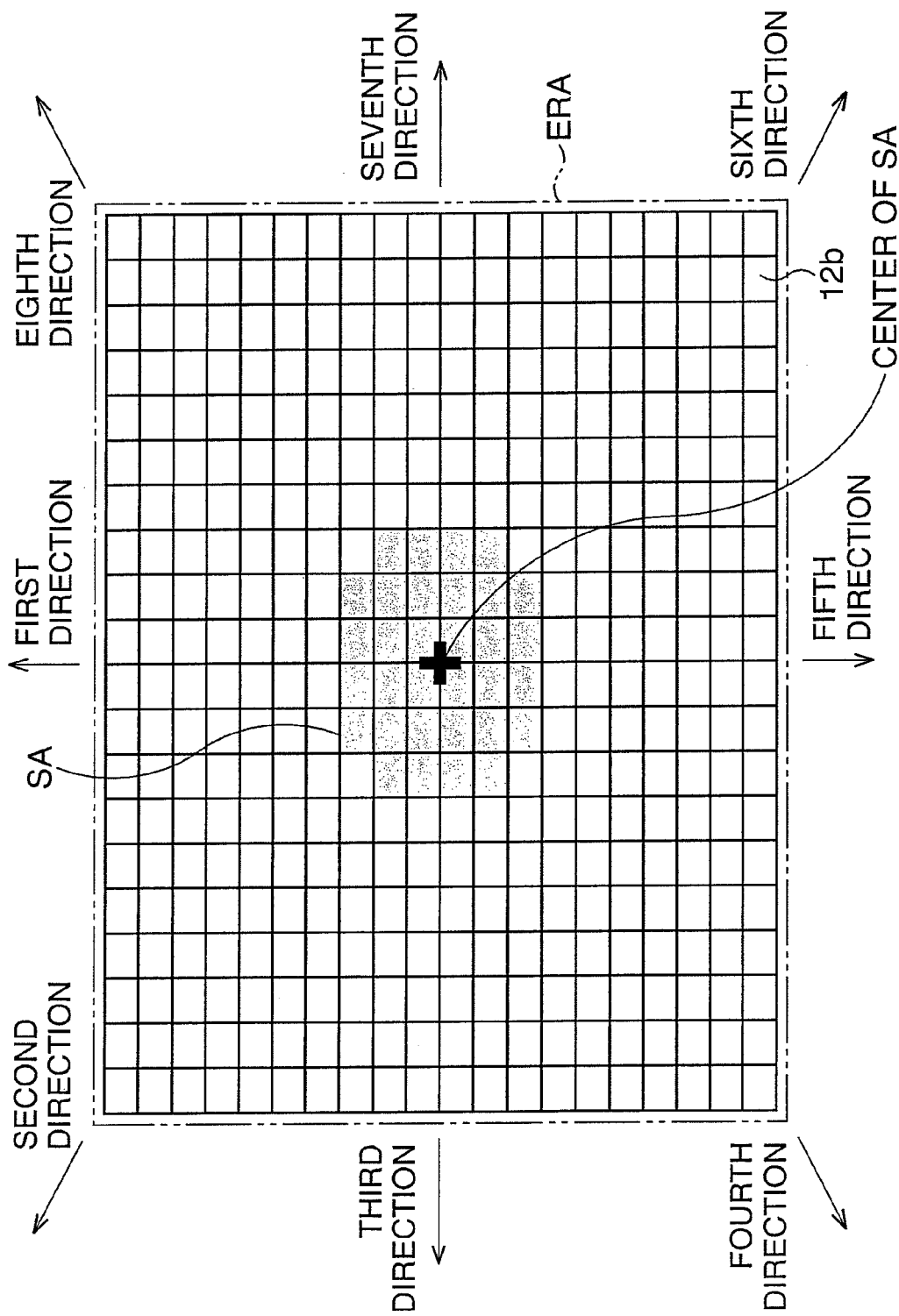
FIG. 5 shows the light-receiving surface for explaining the form of the scanning area comprising pixel blocks.

On carrying out the focusing adjustment, the first setting block 31 initially designates an SA on the light-receiving surface. As shown in FIG. 5, the SA comprises thirty two pixel blocks 12b. In addition, the form of the SA is in the shape of a cross shape, created by removing four corner blocks from a rectangle comprising pixel blocks 12b of six columns across by six rows down.

Figure 6:
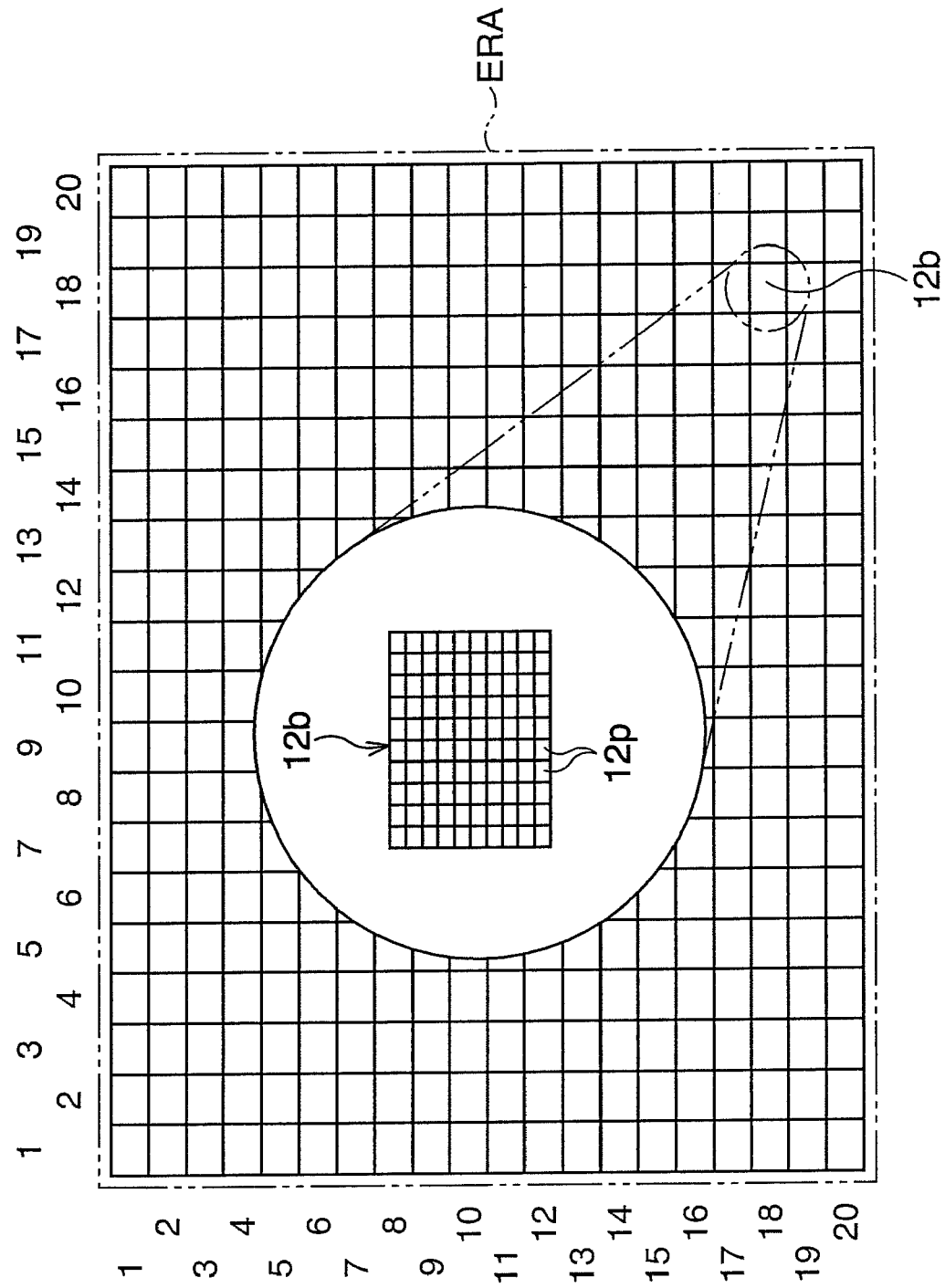
FIG. 6 shows the structure of the ERA of the imaging device.

As shown in FIG. 6, the pixel block 12b is a unit of area representing 1/400 of the ERA, which has been equally partitioned into twenty rows and twenty columns. The pixel block 12b is equally partitioned itself, so that the pixel block 12b comprises one hundred pixels arranged in a matrix of ten rows by ten columns. Incidentally, the pattern matching described later is carried out based on a signal component corresponding to the pixel block 12b in the pursuit function that minimizes processing time.

The first setting block 31 determines the initial location of the SA so that the centers of both the ERA of the imaging device 12 and the SA agree with each other (see FIG. 5).

Incidentally, the pixel blocks 12b on the ERA are separated from each other by borderlines formed by a plurality of vertical and horizontal lines demarcating the columns and rows created from partitioning the ERA. One of the many intersection points formed by the crosshairs of intersecting vertical and horizontal borderlines can be decided upon as the center of the SA, and the location of the initial SA is designated from the location of the center of the SA. The location of the SA is designated based on the operational command which is input to the input block 15.

Data corresponding to the initially designated SA is sent to the second setting block 32. The second setting block 32 designates eight candidate areas which are of the same size as the current SA, but whose locations are different and determined by displacing the current SA by the same magnitude, but in eight different directions.

The first~eighth directions are predetermined as the eight directions in which to displace the SA to designate the candidate areas. The upper, upper left, left, lower left, lower, lower right, right, and upper right directions are predetermined as the first, second, third, fourth, fifth, sixth, seventh, and eighth directions, respectively, as in FIG. 5.

One pixel block 12b is predetermined to correspond to the distance from the SA to each candidate area. Incidentally, the locations of first~eighth candidate areas are explained below.

Figure 7:
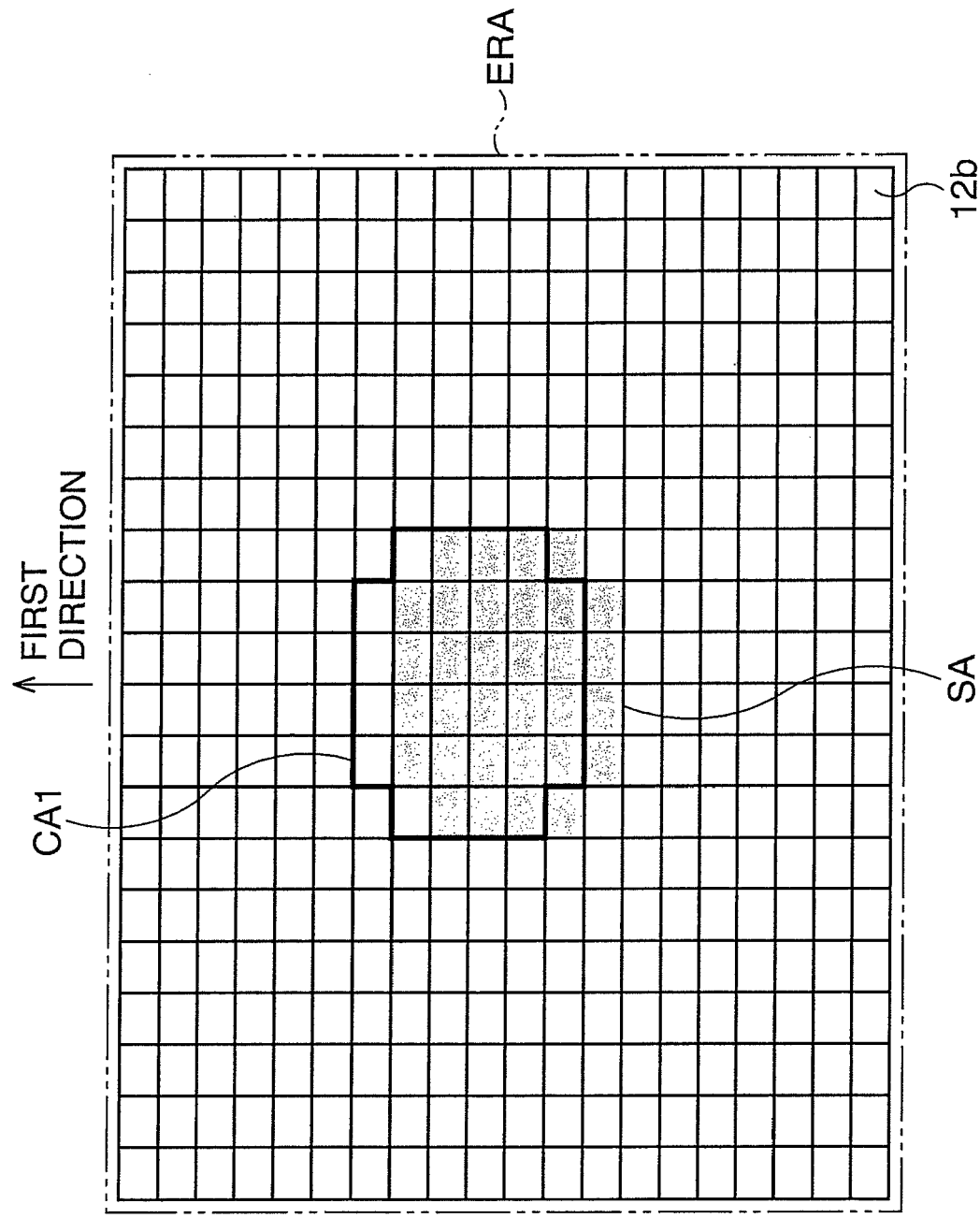
FIG. 7 shows a location of the CA1 relative to the SA.
Figure 8:
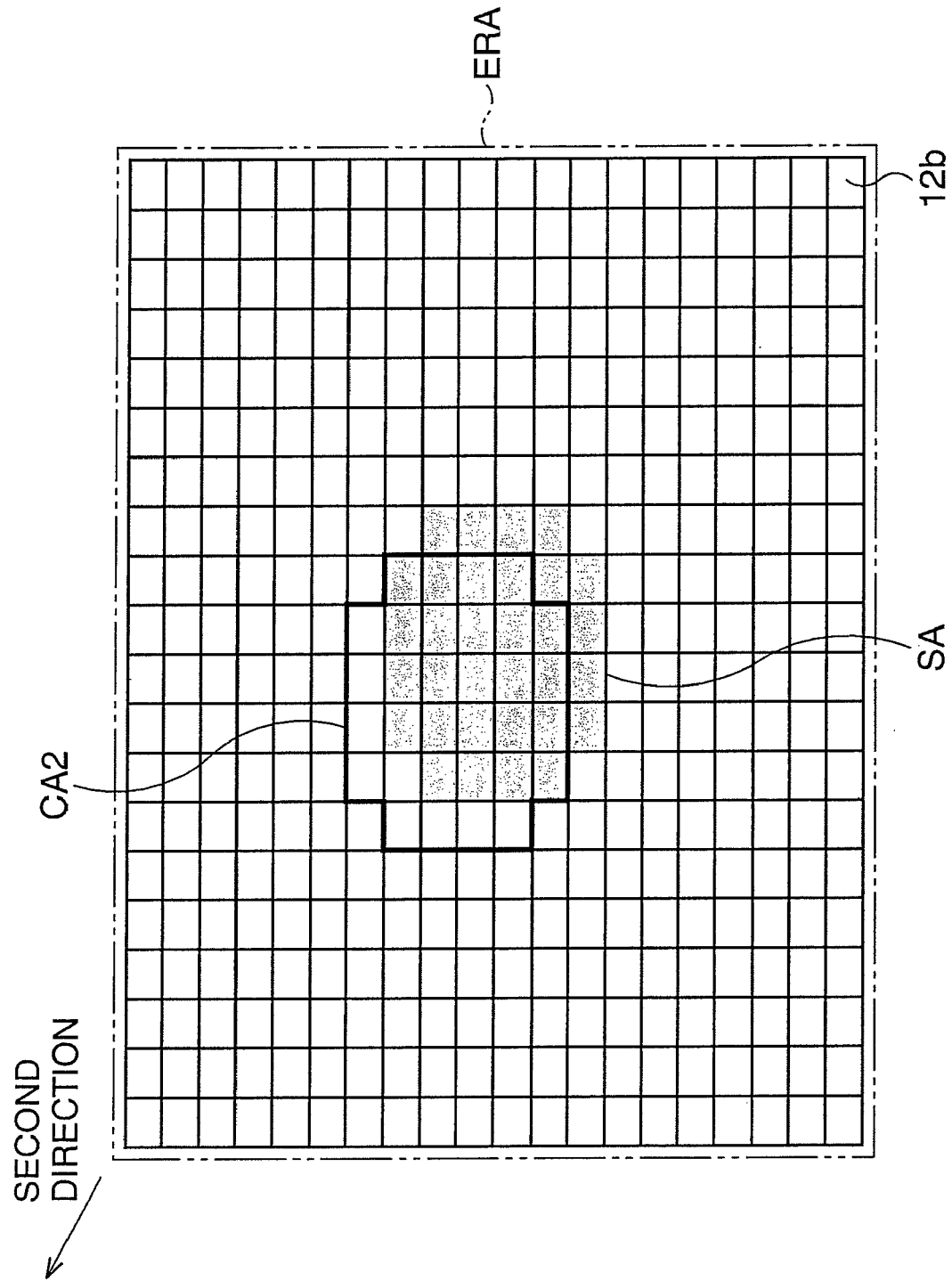
FIG. 8 shows a location of the CA2 relative to the SA.
Figure 9:
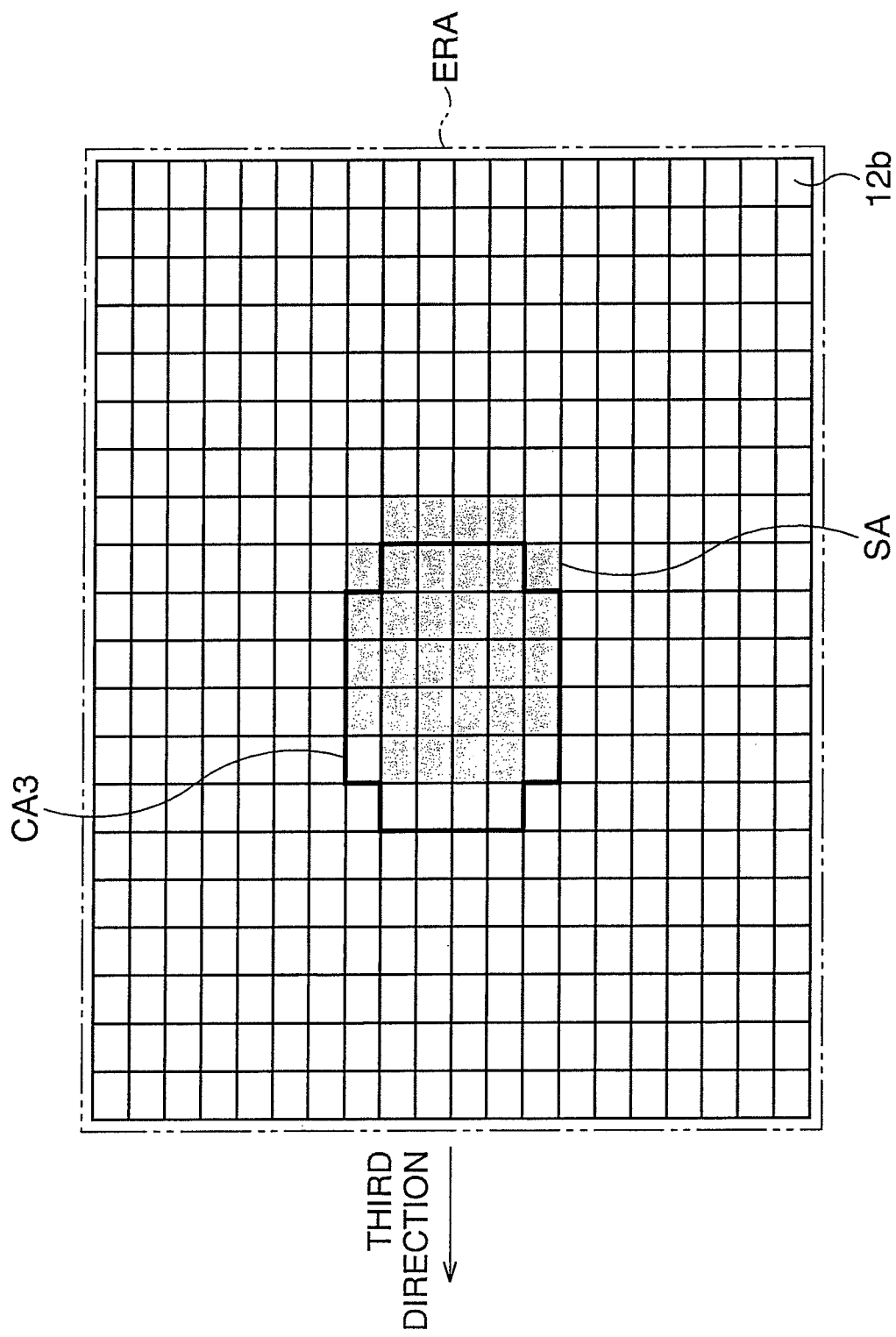
FIG. 9 shows a location of the CA3 relative to the SA.
Figure 10:
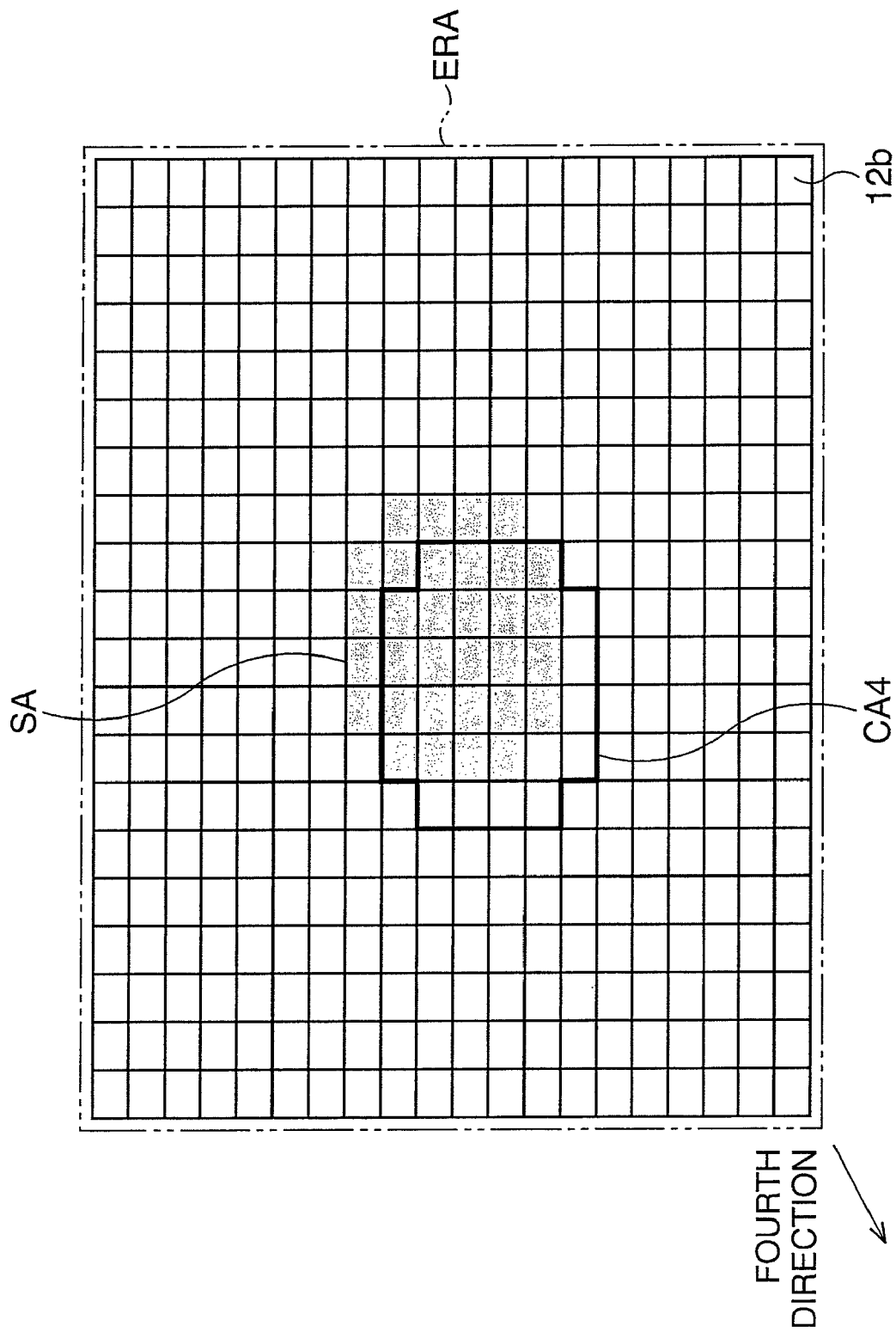
FIG. 10 shows a location of the CA4 relative to the SA.
Figure 11:
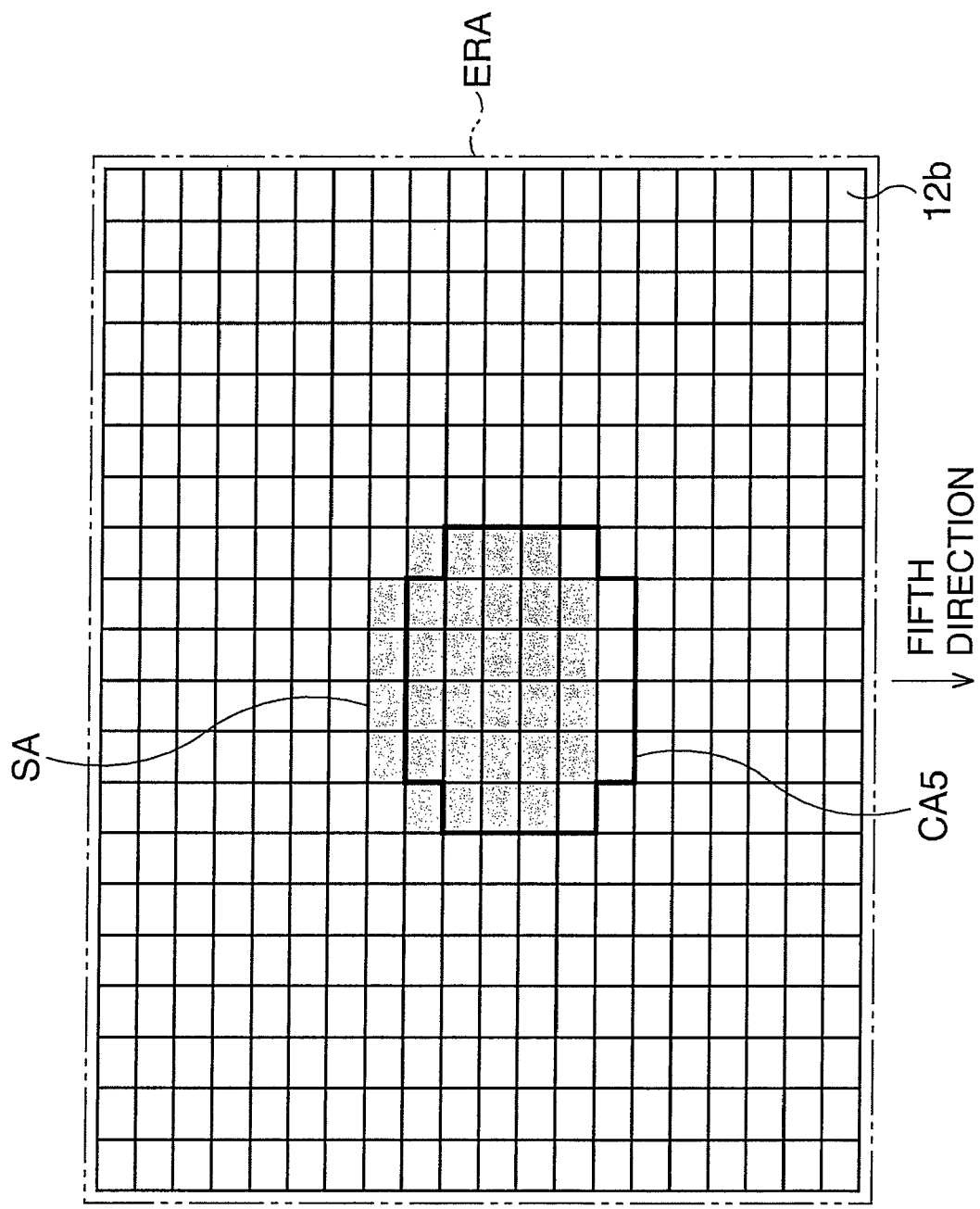
FIG. 11 shows a location of the CA5 relative to the SA.
Figure 12:
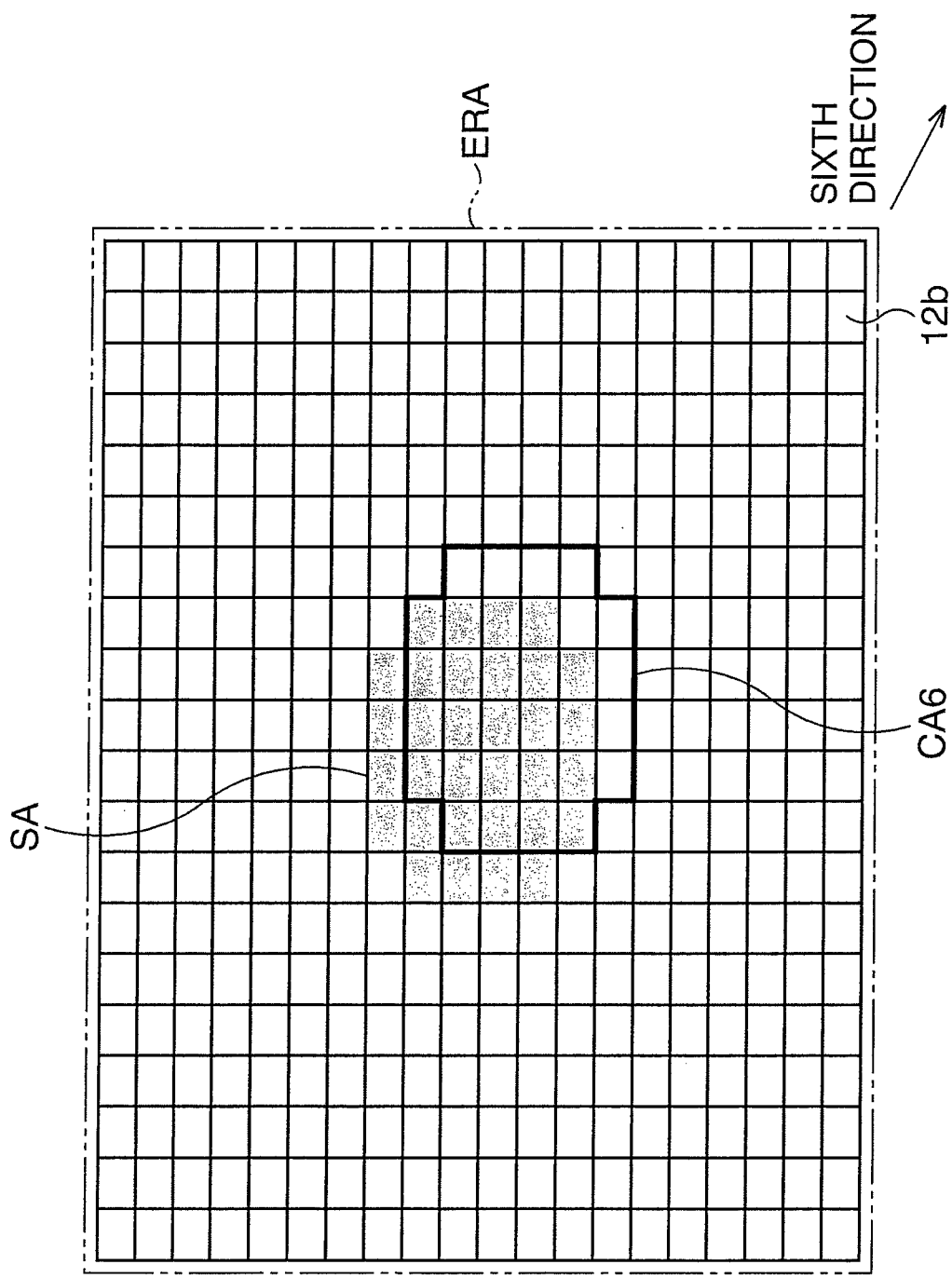
FIG. 12 shows a location of the CA6 relative to the SA.
Figure 13:
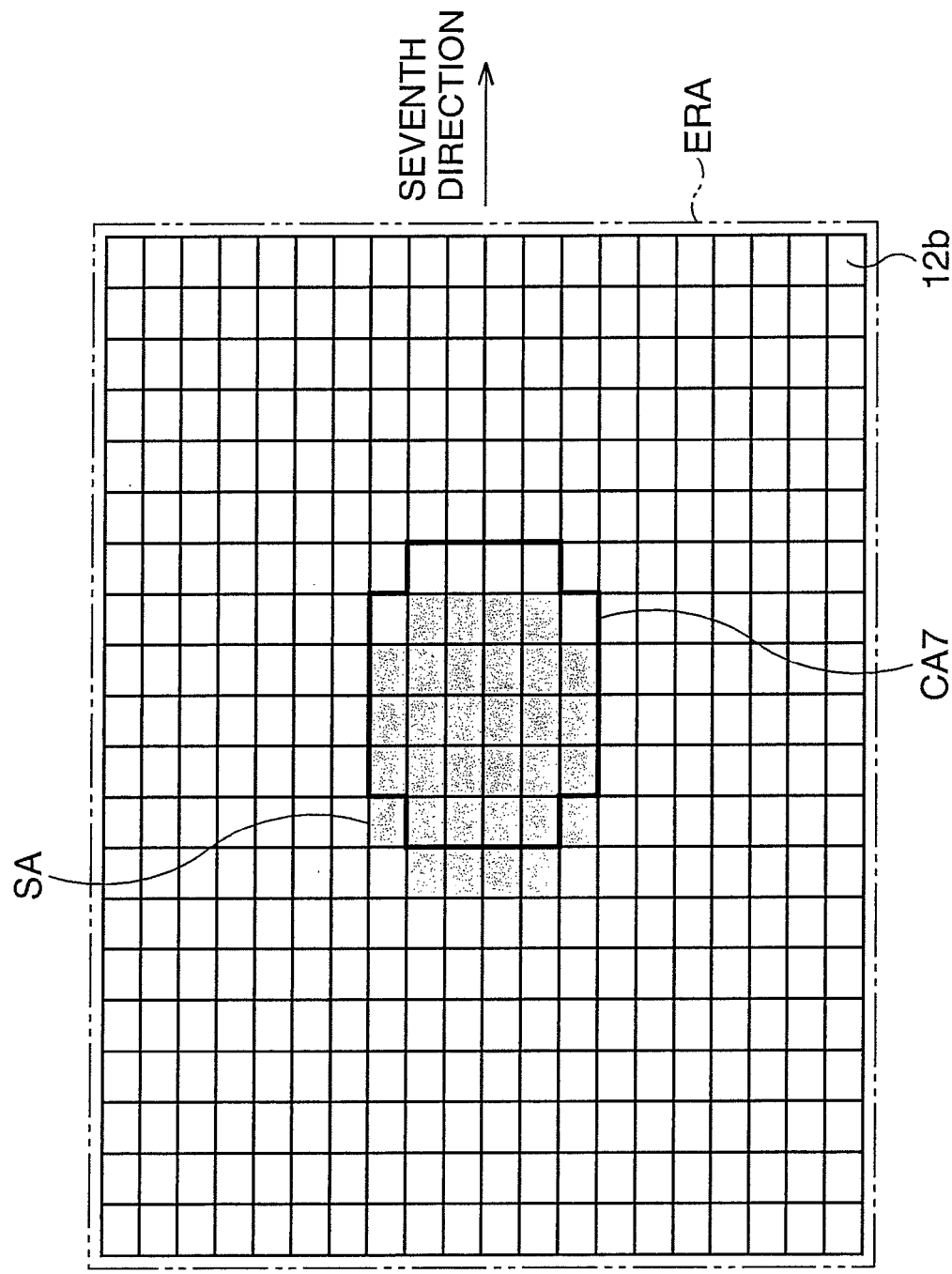
FIG. 13 shows a location of the CA7 relative to the SA.
Figure 14:
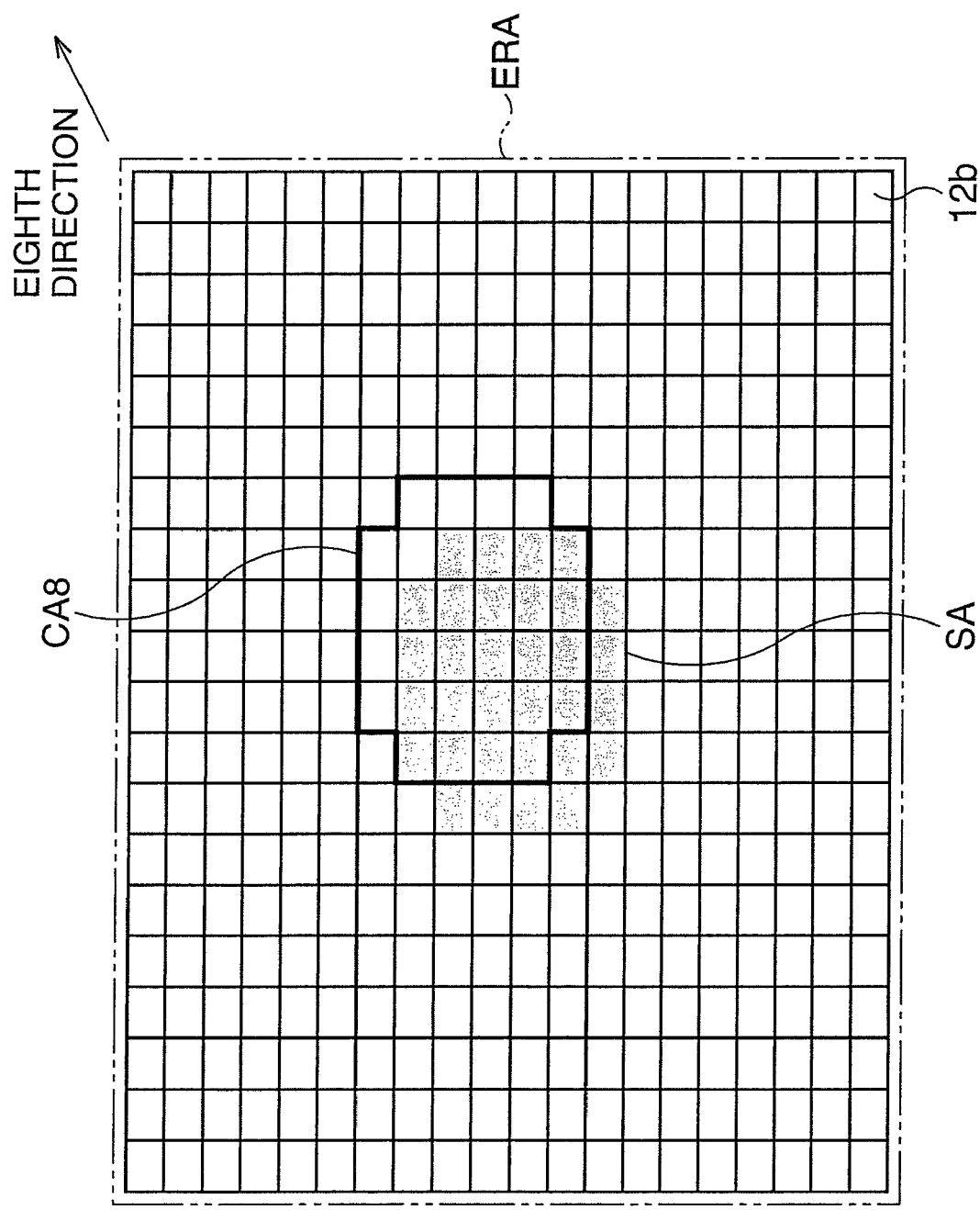
FIG. 14 shows a location of the CA8 relative to the SA.

A candidate area displaced through one pixel block 12b from the SA in the first direction is designated to be the first candidate area, hereinafter referred to as CA1, shown in FIG. 7. A candidate area displaced through one pixel block 12b from the SA in the second direction is designated to be the second candidate area, hereinafter referred to as CA2, shown in FIG. 8. A candidate area displaced through one pixel block 12b from the SA in the third direction is designated to be the third candidate area, hereinafter referred to as CA3, shown in FIG. 9. A candidate area displaced through one pixel block 12b from the SA in the fourth direction is designated to be the fourth candidate area, hereinafter referred to as CA4, shown in FIG. 10. A candidate area displaced through one pixel block 12b from the SA in the fifth direction is designated to be the fifth candidate area, hereinafter referred to as CA5, shown in FIG. 11. A candidate area displaced through one pixel block 12b from the SA in the sixth direction is designated to be the sixth candidate area, hereinafter referred to as CA6, shown in FIG. 12. A candidate area displaced through one pixel block 12b from the SA in the seventh direction is designated to be the seventh candidate area, hereinafter referred to as CA7, shown in FIG. 13. A candidate area displaced through one pixel block 12b from the SA in the eighth direction is designated to be the eighth candidate area, hereinafter referred to as CA8, shown in FIG. 14.

Data corresponding to the designated CA1~CA8 is sent to the recognition block 33, as is data corresponding to the SA initially designated by the first setting block 32. In addition, the red, green, and blue pixel signal components for each pixel in the image data are sent to the recognition block 33 from the first data processing block 14p1.

The recognition block 33 generates either a green signal component or red, green, and blue signal components for each pixel block 12b comprising the SA and the CA1~CA8, comprises based on one frame of image data. Incidentally, only the green signal component is generated for the pixel blocks 12b when the amplification ratio is greater than the first threshold value. The red, green, and blue signal components of the pixel blocks 12b are generated when the amplification ratio is less than the first threshold value.

The green signal component of the pixel blocks 12b is calculated by averaging the green pixel signals of the pixels 12p in the pixel blocks 12b comprising the SA and the CA1~CA8. The red, green, and blue pixel block signal components of the pixel block 12b are calculated by averaging the red, green, and blue pixel signals in the pixel blocks 12b comprising the SA and the CA1~CA8, respectively.

For example, assuming the image data sent at a first point in time contains the green signal levels 120, 30, 60, 55, 70, 110, 100, 70, 40, 105, 40, 85, 95, 65, 25, 40, 150, 120, 60, 30, 25, 45, 100, 120, 110, 95, 80, 50, 90, 75, 80, and 20 for the pixel blocks 12b comprising the SA from left to right and from top to bottom, respectively, these signal levels are calculated as the green signal components corresponding to the SA at the first point in time (see FIG. 15).

The green signal components or the red, green, and blue signal components for the pixel blocks 12b of the SA and the CA1~CA8 are converted to binary values, for example 0 or 1, based on the generated signal components. For the conversion to binary values, an average value of the signal levels of each color pixel signal components for the pixel blocks 12b comprising the SA and the CA1~CA8 is calculated, and each individual signal level is subsequently compared to the average signal level. If a signal level is higher than the average signal level, the signal level is converted to 1. If a signal level is lower than the average signal level, the signal level is converted to 0.

For example, the average of the signal levels of the green signal components of the pixel blocks 12b in the SA shown in FIG. 15 is 73.75. In the conversion to binary values, the signal level of the green signal components for the pixel blocks 12b in the SA are converted to 1, 0, 0, 0, 0, 1, 1, 0, 0, 1, 0, 1, 1, 0, 0, 0, 1, 1, 0, 0, 0, 0, 1, 1, 1, 1, 1, 0, 1, 1, 1, and 0 from left to right and from top to bottom, respectively (see FIG. 16). Incidentally, the signal levels of the red, green, and blue signal components of the pixel blocks 12b are converted to binary values in a similar manner.

Data corresponding to the green signal components of the pixel blocks 12b that have been converted to binary values is sent to the third setting block 34, which infers to which of the CA1~CA8 the target object, which has been captured by the SA at the current point in time, is moved to at the subsequent time of image capture.

Incidentally, the inference is carried out based on the green signal components of the pixel blocks 12b in the SA that have been converted to binary values at one point in time, and the green signal components of the pixel blocks 12b in the CA1~CA8 that are generated and converted to binary values from a different frame of image data captured at as subsequent point in time.

The calculation of the first~eighth likeness values is prerequisite to determining which candidate area is selected from the CA1~CA8. The determination of the selected candidate area based on the calculated first~eighth likeness values is described in detail below.

The first~eighth likeness values are calculated values that indicate how similar the image captured in the SA is to the images captured in the CA1~CA8 at the time of subsequent image capture. To calculate each likeness value, two green signal components converted to binary values for pixel blocks 12b at the relatively same location in both the SA and the CA1~CA8 are compared to each other, and it is determined whether or not they are equal to each other. The likeness value is the number of combinations of green signal components compared to one another whose signal levels are unequal. Accordingly, the lower the likeness value, the greater the similarity inferred between the images captured in the SA and the candidate area.

The third setting block 34 comprises an exclusive-or circuit (not depicted). The green signal components of the pixel blocks 12b at the relatively same location in the SA and the CA1 that have been converted to binary values are input to the exclusive-or circuit. When the green signal components of the pixel blocks 12b at the relatively same location in the SA and the CA1 that have been converted to binary values are equal to each other, the exclusive-or circuit outputs 0. On the other hand, when the green signal components of the pixel blocks 12b at the relatively same location in the SA and the CA1 that have been converted to binary values are unequal to each other, the exclusive-or circuit outputs 1.

For example, the green signal components for the pixel blocks 12b in the CA1 that have been converted to binary values are 0, 0, 0, 1, 1, 1, 1, 1, 0, 0, 1, 1, 1, 0, 0, 1, 1, 0, 0, 1, 0, 0, 1, 1, 0, 1, 1, 0, 0, 1, 1, and 0 from left to right and from top to bottom, respectively, as shown in FIG. 17. When the green signal components in the top row and leftmost column for the pixel block 12b in the SA and the CA1 that have been converted to binary values are input to the exclusive-or circuit, the exclusive-or circuit outputs 1. Similarly, when the green signal components in the top row and second to leftmost column for the pixel block 12b in the SA and the CA1 that have been converted to binary value are input to the exclusive-or circuit, the exclusive-or circuit outputs 0. Hereinafter, similarly, when the combinations of the green signal components converted to binary values of the pixel block 12b in the SA and the CA1 at the relatively same location are input to the exclusive-or circuit from left to right and from top to bottom, the exclusive-or circuit outputs 1, 0, 0, 1, 1, 0, 0, 1, 0, 1, 1, 0, 0, 0, 0, 1, 0, 1, 0, 1, 0, 0, 0, 0, 1, 0, 0, 0, 1, 0, 0, and 0, respectively. The number of times the exclusive-or circuit outputs 1 is counted and saved as a first likeness value, hereinafter referred to as U(exor).

Similarly, the SA and the CA2 are compared to each other, and the second likeness value, hereinafter referred to as UL(exor), is calculated. Similarly, the SA and the CA3 are compared to each other, and the third likeness value, hereinafter referred to as L(exor), is calculated. Similarly, the SA and the CA4 are compared to each other, and the fourth likeness value, hereinafter referred to as DL(exor), is calculated. Similarly, the SA and the CA5 are compared to each other, and the fifth likeness value, hereinafter referred to as D(exor), is calculated. Similarly, the SA and the CA6 are compared to each other, and the sixth likeness value, hereinafter referred to as DR(exor), is calculated. Similarly, the SA and the CA7 are compared to each other, and the seventh likeness value, hereinafter referred to as R(exor), is calculated. Similarly, the SA and the CA8 are compared to each other, and the eighth likeness value, hereinafter referred to as UR(exor), is calculated.

The third setting block 34 determines the lowest likeness value among U(exor), UL(exor), L(exor), DL(exor), D(exor), DR(exor), R(exor), and UR(exor). The candidate area of which the likeness value is the lowest is determined and selected by the third setting block 34 as the area where the targeted object has moved from the scanning area. The selected candidate area is re-designated as the new scanning area.

Incidentally, when the recognition block 33 generates the red, green, and blue signal components of the pixel blocks 12b, the first~eighth red likeness values, first~eighth green likeness values, and first~eighth blue likeness values are calculated based on the signal level of the red, green, and blue signal components of the pixel blocks 12b, similar to the above. Next, the first red, green, and blue likeness values are summed up and calculated as the U(exor). The UL(exor), L(exor), DL(exor), D(exor), DR(exor), R(exor), and UR(exor) are calculated similar to the U(exor). Lastly, the third setting block 34 determines the lowest likeness value among the U(exor), UL(exor), L(exor), DL(exor), D(exor), DR(exor), R(exor), and UR(exor). The candidate area of which likeness value is the lowest is determined and selected by the third setting block 34 as the area where the targeted object has moved from the scanning area. The selected candidate area is re-designated as the new scanning area.

Incidentally, when the normal auto focus function is carried out, only the first setting block 31 in the pursuit block 30 is functional, while the second setting block 32, the recognition block 33, and the third setting block 34 are suspended.

Data corresponding to the SA initially designated by the first setting block 31 is sent to the AF adjustment block 14a through the recognition block 33 and the third setting block 34. Incidentally, the initially designated SA remains the SA in the normal auto focus function, dissimilar to the pursuit auto focus function.

Figure 18:
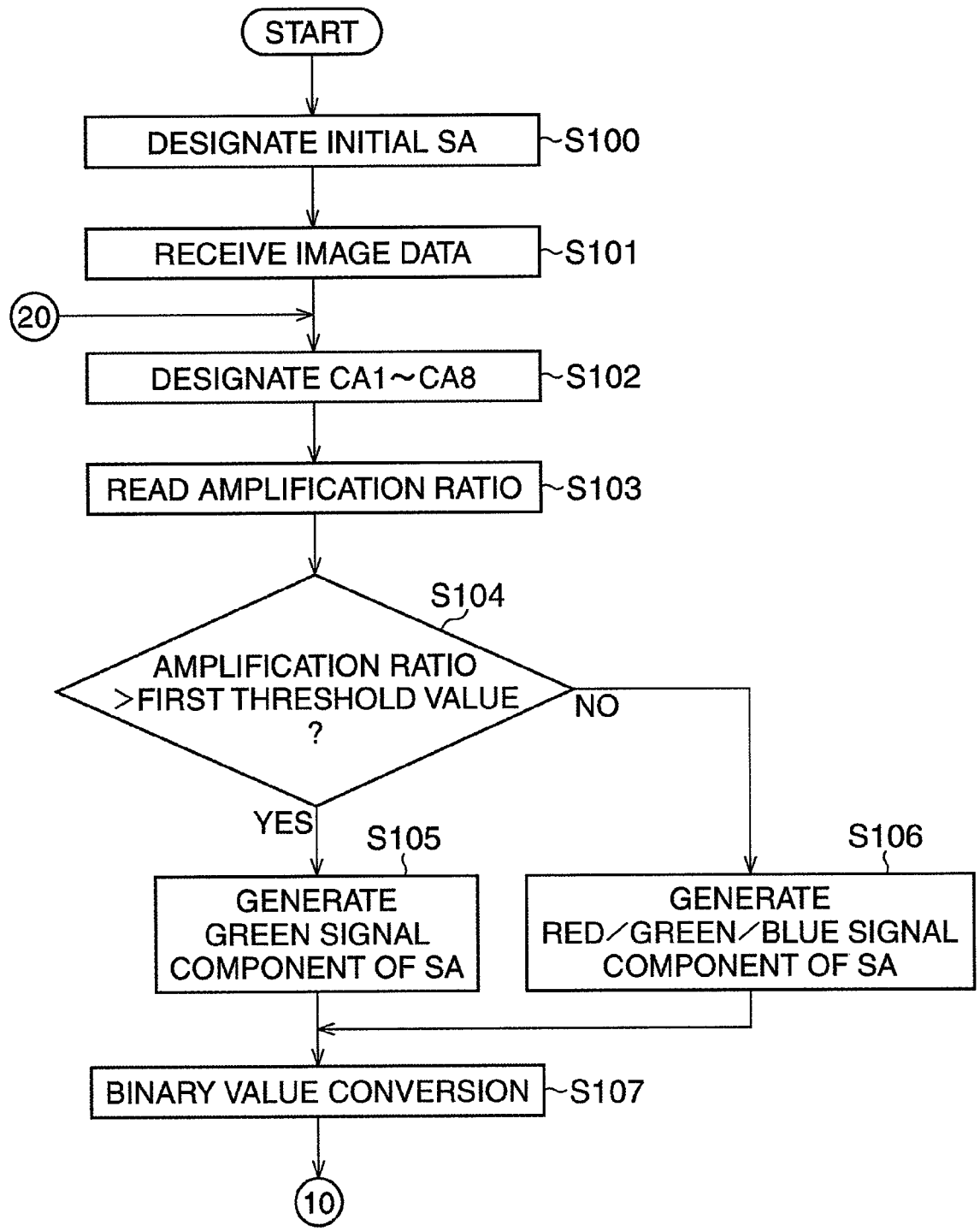
FIG. 18 is a first flowchart explaining the process for designation of the scanning area carried out by the pursuit block.
Figure 19:
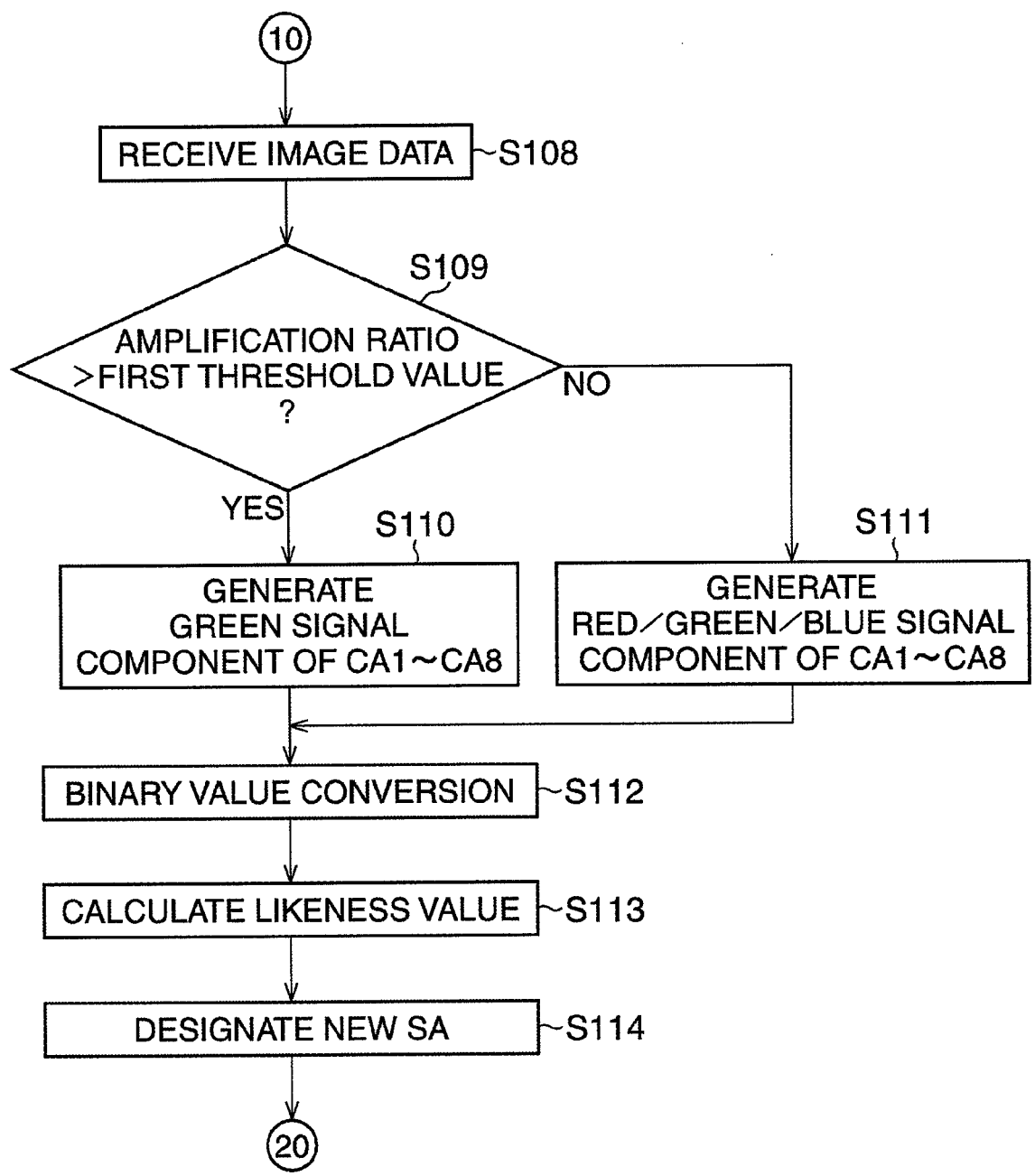
FIG. 19 is a second flowchart explaining the process for designation of the scanning area carried out by the pursuit block.

Next, the process for designation of the scanning area carried out by the pursuit block 30 is explained using the flowchart of FIGS. 18 and 19.

The process for designation of the scanning area starts when the release button is depressed halfway, effectively switching on the pursuit auto focus function. Incidentally, the process for designation of the scanning area is repeated until the power button is switched off or the pursuit auto focus function is switched off.

At step S100, the SA is initially designated. The SA is designated so that the center of the SA is located at a point in accordance to a user's command input.

At step S101 subsequent to step S100, one frame of image data is received. After receiving the image data, the process proceeds to step S102, where the CA1~CA8 are designated based on the designated SA.

After designation of the CA1~CA8, the process proceeds to step S103, where the control block 14c reads the amplification ratio used in the AFE 13. At step S104 subsequent to step S103, the amplification ratio is compared to the first threshold value.

When the amplification ratio is greater than the first threshold value, the process proceeds to step S105, where the green signal components of the pixel blocks 12b in the SA are generated based on the latest received image data. On the other hand, when the amplification ratio is less than the first threshold value, the process proceeds to step S106, where the red, green, and blue signal components of the pixel blocks 12b in the SA are generated based on the latest received image data.

After either step S105 or step S106 is complete, the process proceeds to step S107, where the green signal components generated at step S105 or the red, green, and blue signal components generated at step S106 are converted to binary values.

After conversion to binary values, the process proceeds to step S108, where the pursuit block 30 receives a frame of subsequently generated image data. At step S109 subsequent to step S108, the amplification ratio of the latest received image data is compared to the first threshold value.

When the amplification ratio is greater than the first threshold value, the process proceeds to step S110, where the green signal components of the pixel blocks 12b in the CA1~CA8 are generated based on the latest received image data. On the other hand, when the amplification ratio is less than the first threshold value, the process proceeds to step S111, where the red, green, and blue signal components of the pixel blocks 12b in the CA1~CA8 are generated based on the latest received image data.

After either step S110 or step S111 is complete, the process proceeds to step S112, where the green signal components generated at step S110 or the red, green, and blue signal components generated at step S111 are converted to binary values.

After conversion to binary values, the process proceeds to step S113, where the U(exor), UL(exor), L(exor), DL(exor), D(exor), DR(exor), R(exor), and UR(exor) are calculated based on the color signal components of the pixel blocks 12b in the SA and the CA1~CA8 that have been converted to binary values.

At step S114 subsequent to step S113, the candidate area, of which the likeness value is the lowest among the U(exor), UL(exor), L(exor), DL(exor), D(exor), DR(exor), R(exor), and UR(exor), is designated as the new SA.

After completion of step S114, the process returns to step S102, and steps S102~114 are repeated.

In the above first embodiment, the signal component used for the pattern matching can be changed to either the singular green signal component, or the aggregate of the red, green, and blue signal components, according to the amplification ratio by the AFE 13 based on the brightness of the object.

In general, the accuracy of pattern matching can be improved by using many different color signal components.

On the other hand, when the signal level of the pixel signal prior to the amplification is low because of a low amount of light received by a pixel 12p, the S/N is also decreased accordingly. In such a case, the accuracy of pattern matching may deteriorate by using many different color signal components.

It is general knowledge for a prior digital camera to lower an amplification ratio when an optical image of an object is bright and to raise the amplification ratio when the optical image is dark. So, by changing the color signal components used for the pattern matching, according to the amplification ratio, the capability exists to carry out accurate pattern matching for an object whether the optical image of the object is bright or dark.

Figure 20:
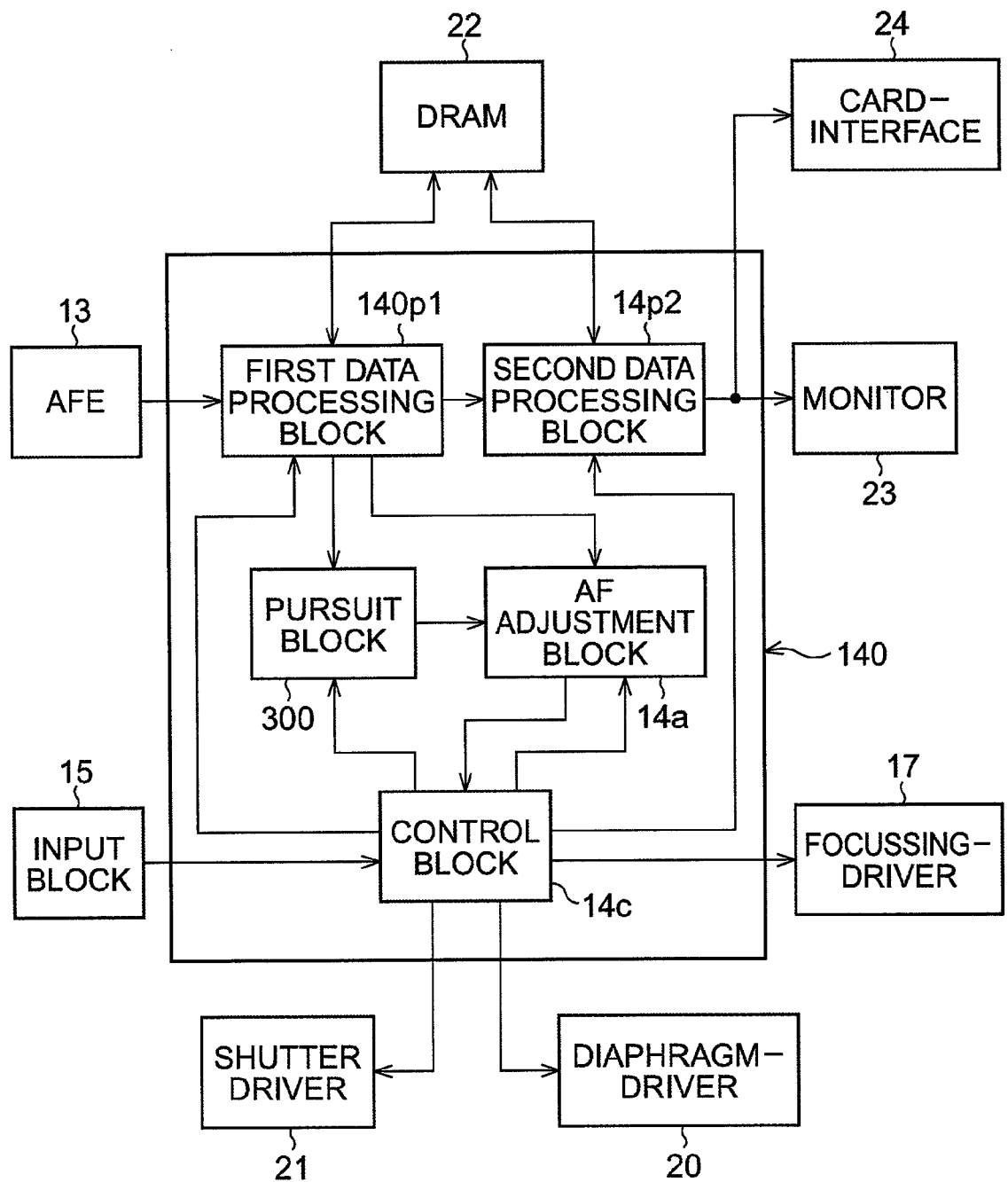
FIG. 20 is a flowchart explaining the process for a first determination carried out by the pursuit block.

Next, a pattern matching system of the second embodiment is explained below, using FIGS. 20, 21. The primary difference between the second embodiment and the first embodiment, which is explained below, is the type of signal component used for pattern matching. Incidentally, the same symbols are used for the structures that are comparable to those in the first embodiment.

The structures and functions of the digital camera of the second embodiment, with the exception of the DSP, are the same as those of the first embodiment. The functions of the first data processing block 140p1 and a pursuit block 300 of the DSP 300 are especially different from those of the first embodiment (see FIG. 20).

The first data processing block 140p1 carries out chrominance difference data generation processing in addition to the predetermined data processing of the first embodiment. Incidentally, by luminance data generation processing and chrominance difference data generation processing, data corresponding to luminance, hereinafter referred to as Y, and data corresponding to chrominance difference, hereinafter referred to as Cr and Cb are generated. Further, the first data processing block 140p1 sends the image data, having undergone predetermined data processing, to the second data processing block 140p2.

The second data processing block 140p2 carries out predetermined data processing similar to the first embodiment.

The first data processing block 140p1 sends the image data to the pursuit block 300. Based on the received image data, the pursuit block 300 pursues the targeted object.

Figure 21:
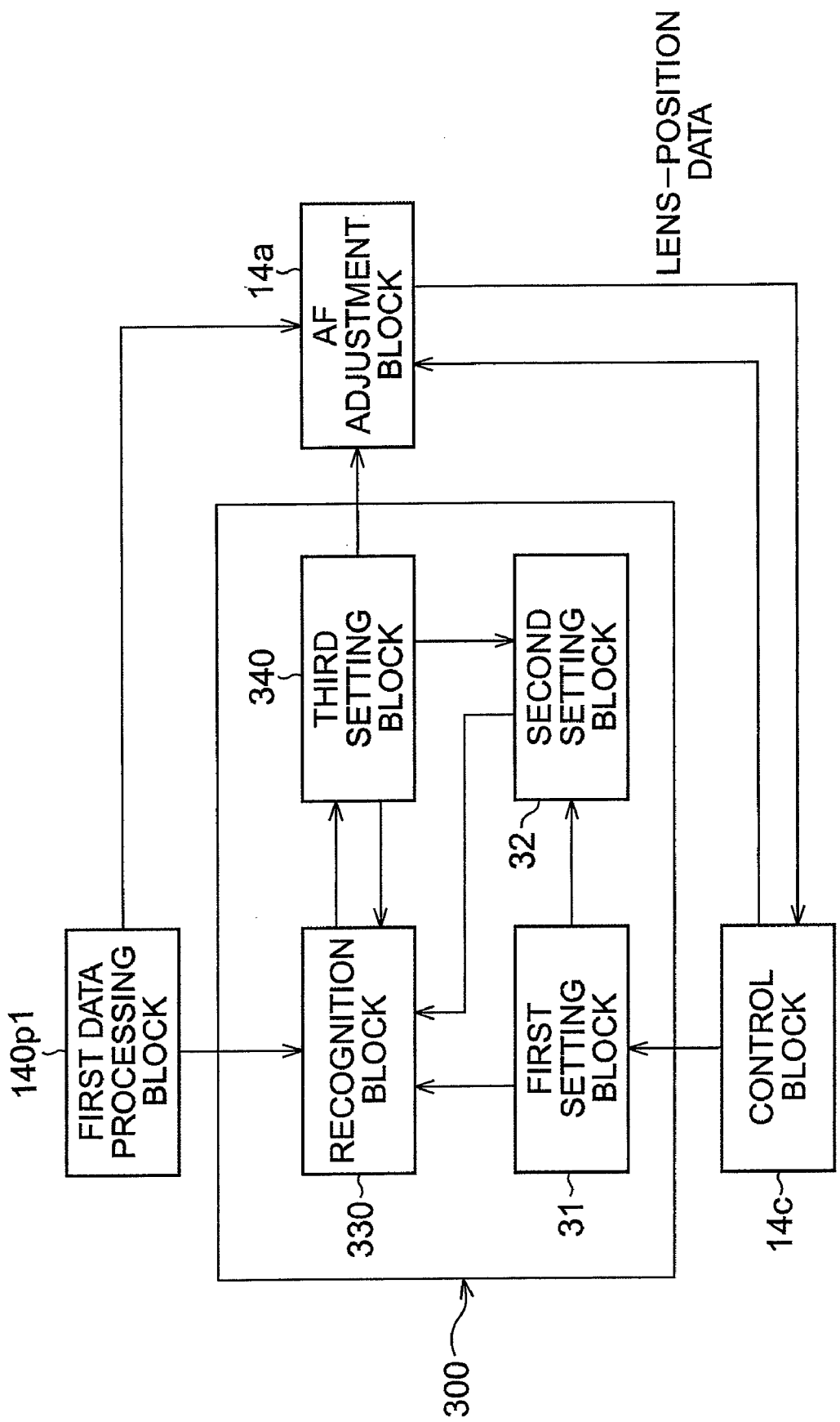
FIG. 21 is a flowchart explaining the process for a second determination carried out by the pursuit block.

In the pursuit block 300, only the functions of the recognition block 330 and the third setting block 340 are different from those of the first embodiment (see FIG. 21). The first setting block 31 initially designates an SA, similar to the first embodiment. In addition, the second setting block designates the CA1~CA8.

Data corresponding to the initially designated SA and the designated CA1~CA8 is sent from the first setting block 31 and the second setting block 32, respectively, to the recognition block 330, similar to the first embodiment. In addition, data corresponding to the Y and the Cr/Cb of each pixel 12p are sent from the first data processing block 140p1 to the recognition block 330.

The recognition block 330 generates the Y and Cr/Cb of each pixel block 12b comprising the SA and the CA1~CA8. Incidentally, only the Y of the pixel blocks 12b is generated when the amplification ratio is greater than the first threshold value. However, both Y and Cr/Cb of the pixel blocks 12b are generated when the amplification ratio is less than the first threshold value.

The Y of the pixel blocks 12b is calculated by averaging the Y of the pixels 12p in the pixel blocks 12b comprising the SA and the CA1~CA8. The Y and Cr/Cb of the pixel blocks 12b are calculated by averaging the Y and Cr/Cb of the pixel blocks 12b comprising the SA and the CA1~CA8, respectively.

The singular Y or the combination of Y and Cr/Cb of the pixel blocks 12b of the SA and the CA1~CA8 are converted to binary values.

Data corresponding to the singular Y or the combination of Y and Cr/Cb of the pixel blocks 12b that have been converted to binary values is sent to the third setting block 340, which infers to which one of the CA1~CA8 the target object has moved at the time of a captured image that is subsequent to target object's previous capture by the SA at an earlier point in time.

Incidentally, the inference is carried out based on the singular Y or the combination of Y and Cr/Cb of the pixel blocks 12b in the SA that were converted to binary values, at one point in time; and the singular Y or the combination of Y and Cr/Cb of the pixel blocks 12b in the CA1~CA8 that were converted to binary values, at subsequent point in time.

The U(exor), UL(exor), L(exor), DL(exor), D(exor), DR(exor), R(exor), and UR(exor) are calculated similar to the first embodiment, and one candidate area is selected from the CA1~CA8 based on the U(exor), UL(exor), L(exor), DL(exor), D(exor), DR(exor), R(exor), and UR(exor).

In the above second embodiment, the signal component used for the pattern matching can be changed to either the singular Y, or the combination of Y and Cr/Cb, according to the amplification ratio determined by the AFE 13 based on the brightness of the object being pursued. Accordingly, accurate pattern matching can be accomplished for an object whether an optical image of the object is bright or dark, similar to the first embodiment.

In addition, in the above first and second embodiments, pattern matching can be carried out with greater stability because the signal components of each pixel block 12b are converted to binary values. For example, when the SA or a candidate area receives light emitted from a light source generating flicker, such as fluorescent light, a portion of the calculated likeness value may not accord to the actual optical image. However, because influence of such flicker is reduced upon the conversion to binary values, pattern matching can be carried out with greater stability.

In the first embodiment, when the amplification ratio is less than the first threshold value, the red, green and blue signal components are used for the pattern matching. However, the pattern matching may be carried out using only the red and green signal components, or only the green and blue signal components, when the amplification ratio is in the range between the first threshold value and a second threshold value that is less than the first threshold value. In addition, when the amplification ratio is less than the second threshold value, three different color signal components may be used. Even if only two different color signal components are used, pattern matching is still more accurate than that using only the green signal component.

In the second embodiment, when the amplification ratio is less than the first threshold value, the Y and Cr/Cb are used for the pattern matching. However, the pattern matching may be carried out using the Y and only one of either the Cr or Cb.

For pattern matching, only the green signal component is used when the amplification ratio is greater than the first threshold value, and the red, green, and blue signal components are used when the amplification ratio is less than the first threshold value, in the first embodiment. However, the type of the signal component used for pattern matching may be changed according to the amplification ratio.

For example, when the amplification ratio is great, the red, green, and blue signal components can be used for pattern matching. Generally, when the amplification ratio is great, it is preferable to use a singular signal component for the pattern matching as described in the above embodiments. However, if the color component of an optical image of an object is extremely partial, the accuracy of pattern matching using a singular color signal component may deteriorate. In such a case, it is preferable to increase the type of the color signal components used for the pattern matching, according to the amplification ratio.

Similarly, for pattern matching, only the Y is used when the amplification ratio is greater than the first threshold value, while both the Y and Cr/Cb are used when the amplification ratio is less than the first threshold value, in the second embodiment. However, the type of the signal component used for pattern matching may be changed according to the amplification ratio.

The number of the pixel blocks 12b comprising the SA and the candidate area is thirty two, in the above first and second embodiments. However, any numbers are adaptable. In addition, the shape of the SA and the candidate area is in the shape of a cross, in the first and second embodiments. However, any shape is adaptable.

One direction in which the targeted object is moved is determined from the first~eighth directions in the above first and second embodiments. However, one direction may be determined from a plurality of directions.

One pixel block 12b corresponds to the magnitude of displacement from the SA to the CA1~CA8, in the above first and second embodiments. However, any number of pixel blocks 12b can correspond to the magnitude of displacement.

The signal components of the pixel blocks 12b comprising the SA and the CA1~CA8 are converted to binary values in the above first and second embodiments. However, the signal components can be converted to any number of different levels, or, such conversions may not be carried out at all. Of course, the effect as described above is achieved by carrying out the conversion to binary values or into values of a level that is different from that of binary values.

The exclusive-or circuit outputs 0 when the signal components converted to binary value of the pixel blocks 12b at the relatively same location of the SA and the CA1 ~CA8 are equal to each other, in the above first and second embodiments. However, an arithmetical circuit mounted in the third setting block 34 may output 0 when the absolute value of the difference between the converted or non-converted signal components of the pixel blocks 12b at the relatively same location of the SA and the CA1~CA8 is lower than a predetermined standard value. Also, the number of pixel blocks 12b outputting 1 by the arithmetical circuit may be counted as the likeness value. Incidentally, the predetermined standard value is 0 in the above first and second embodiments.

The exclusive-or circuit is used in the above first and second embodiments to determine whether or not the signal components converted to binary values of the pixel blocks 12b in the SA, and those of CA1~CA8 are similar to each other. Another arithmetical circuit, such as an exclusive-nor circuit, can be used for the purpose of this determination.

The position of the focus lens 11b where an object is brought into focus is determined according to the contrast detection method, in the above first and second embodiments. However, the position of the focus lens 11b can be determined according to any other method, such as the phase difference detection method.

The primary color filters, which are red, green, and blue filters, are mounted on the imaging device 12 in the above first and second embodiments. However, any other type of color filter, such as a complementary color filter, is adaptable.

The pixels are arranged in a matrix within the ERA, in the above first and second embodiments. However, the arrangement of pixels is not restricted to a matrix and can be arranged in any two-dimensional pattern.

The auto focus functions are carried out for the targeted object pursued by the pursuit block 30 in the above first and second embodiments. However, the pursuit function utilized by the pursuit block 30 to pursue the movement of the targeted object can be adapted to another function. For example, a monitoring camera can display a moving targeted object and a mark showing the targeted object by being adapted to the monitoring camera. Or the exposure adjustment can be automatically carried out for a moving targeted object.

The pattern matching system is used for the pursuit function in the above first and second embodiments. However, the pattern matching system can be used for other functions, such as a face identification system.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-081218 (filed on Mar. 23, 2006), which is expressly incorporated herein, by reference, in its entirety.

The invention claimed is:

1. A pattern matching system that outputs a likeness value, said likeness value indicating how much a first and second image accords to each other, said pattern matching system comprising:

a receiver that receives a first and second image signal corresponding to said first and second image, respectively, as an area signal, said area signal comprising first and second color signal components or luminance and chrominance difference signal components corresponding to the color of a pattern area of which said first and second images are comprised;

a comparison block that compares the signal levels of said area signals corresponding to said pattern areas at the relatively same location of said first and second images;

a calculation block that calculates said likeness value, said likeness value varying according to the number of said pattern areas where the absolute value of the difference between said compared signal levels of said area signal of said first and second images is less than a predetermined standard value;

an output block that outputs said likeness value;

a ratio reading block that reads an amplification ratio by which said first and second image signals are amplified; and a controller that changes the type of said signal components of said area signal used for the comparison by said comparison block and used for the calculation of said likeness value by said calculation block.

2. A pattern matching system according to claim 1, wherein said controller orders said comparison block and said calculation block to compare signal levels and to calculate said likeness value, respectively, using only said first color signal component or said luminance signal component when said amplification ratio is greater than a predetermined threshold value, or using said first and second color signal components or said luminance and chrominance difference signal components when said amplification ratio is less than said predetermined threshold value.

3. A pattern matching system according to claim 1, further comprising a generator that generates said area signal comprising said luminance and chrominance signal components based on said area signal comprising said first and second color signal components; and said controller ordering said comparison block and said calculation block to compare signal levels and to calculate said likeness value, respectively, using only said luminance signal component when said amplification ratio is greater than a predetermined threshold value, or using said luminance and chrominance difference signal components when said amplification ratio is less than said predetermined threshold value.

4. A pattern matching system according to claim 1, wherein said area signal comprises a third color signal component, said controller ordering said comparison block and said calculation block to compare signal levels and to calculate said likeness value, respectively, using said third color signal component also when said amplification ratio is less than a predetermined threshold value.

5. A pattern matching system according to claim 1, wherein said first color signal component is a green signal component.

6. A pattern matching system according to claim 1, further comprising a converter that converts said signal components into binary values, and said comparison block comparing signal levels of said signal components converted to binary values of said area signal corresponding to said pattern areas at the relatively same location of said first and second images.

7. A pattern matching system that estimates how similar a first and second image are to one another, said pattern matching system comprising:

an image signal generator that generates plural types of image signals corresponding to said first and second images;

a detection block that detects the brightness of said first and second image;

a selection block that selects a number of different types of said image signals for pattern matching based on said detected brightness so that an increase in the number of said selected types is directly proportional to said detected brightness; and a pattern matching block that carries out pattern matching of said first and second image using said selected type of image signal.

8. A pattern matching system according to claim 7, wherein said selection block selects singular type of said image signal when said detected brightness is less than a predetermined brightness.

9. A pattern matching system according to claim 7, further comprising an amplification block that amplifies said image signal so that a signal level of said amplified image signal is equal to a predetermined signal level, and detection block detects said brightness based on an amplification ratio by which said amplification block amplifies said image signal.

* * * * *